(12) United States Patent
Davies et al.

(10) Patent No.: US 9,508,146 B2
(45) Date of Patent: Nov. 29, 2016

(54) AUTOMATED FRAME OF REFERENCE CALIBRATION FOR AUGMENTED REALITY

(71) Applicant: The Boeing Company, Chicago, IL (US)

(72) Inventors: Paul R. Davies, Huntington Beach, CA (US); David K. Lee, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 459 days.

(21) Appl. No.: 13/665,837

(22) Filed: Oct. 31, 2012

(65) Prior Publication Data
US 2014/0118339 A1    May 1, 2014

(51) Int. Cl.
*G06T 7/00* (2006.01)
*G06T 19/00* (2011.01)
*G06T 3/60* (2006.01)
*G06T 15/10* (2011.01)

(52) U.S. Cl.
CPC .............. *G06T 7/0018* (2013.01); *G06T 3/60* (2013.01); *G06T 7/0024* (2013.01); *G06T 7/0042* (2013.01); *G06T 15/10* (2013.01); *G06T 19/006* (2013.01)

(58) Field of Classification Search
None
See application file for complete search history.

(56) References Cited

U.S. PATENT DOCUMENTS

| 7,778,794 | B2 | 8/2010 | Davies et al. |
| 8,423,318 | B1 | 4/2013 | Baker et al. |
| 2002/0094189 | A1* | 7/2002 | Navab et al. ............... 386/4 |
| 2007/0236514 | A1* | 10/2007 | Agusanto et al. ........... 345/646 |
| 2010/0097195 | A1 | 4/2010 | Majoros et al. |
| 2012/0071998 | A1 | 3/2012 | Davies et al. |
| 2012/0183137 | A1 | 7/2012 | Laughlin |
| 2012/0327187 | A1 | 12/2012 | Troy et al. |

OTHER PUBLICATIONS

Kato, H., Billinghurst, M., Poupyrev, I., Imamoto, K., & Tachibana, K. (2000), Virtual object manipulation on a table-top AR environment. In Augmented Reality, 2000.(ISAR 2000). Proceedings. IEEE and ACM International Symposium on (pp. 111-119). Ieee.*
Kato, Hirokazu, and Mark Billinghurst, "Marker Tracking and HMD Calibration for a Video-based Augmented Reality Conferencing System." Augmented Reality, 1999.(IWAR'99) Proceedings. 2nd IEEE and ACM International Workshop on. IEEE, 1999.*

(Continued)

*Primary Examiner* — Mark Zimmerman
*Assistant Examiner* — Sarah Le
(74) *Attorney, Agent, or Firm* — Kunzler Law Group, PC

(57) ABSTRACT

One or more systems, methods, routines and/or techniques for automated frame of reference calibration for augmented reality are described. One or more systems, methods, routines and/or techniques may allow for calibration of an Augmented Reality (AR) system, for example, by automatically calibrating the frames of reference of virtual objects and/or a camera. One example calibration routine and/or technique may determine and/or calculate a mapping or transform from a frame of reference of a virtual object (e.g., a CAD model) to a coordinate frame associated with the tracking system. Another example calibration routine and/or technique may determine and/or calculate a mapping or transform from a camera lens frame of reference to a frame of reference of the whole camera as determined by a tracking system. These routines and/or techniques may calibrate an AR system to provide rapid, precise alignment between virtual content and a live camera view of a real scene.

20 Claims, 14 Drawing Sheets

(56) References Cited

OTHER PUBLICATIONS

Baratoff, Gregory, Alexander Neubeck, and Holger Regenbrecht. "Interactive multi-marker calibration for augmented reality applications." Proceedings of the 1st International Symposium on Mixed and Augmented Reality. IEEE Computer Society, 2002.*

Kutulakos, Kiriakos N., and James Vallino. "Affine object representations for calibration-free augmented reality." Virtual Reality Annual International Symposium, 1996., Proceedings of the IEEE 1996. IEEE, 1996.*

Kanbara, Masayuki, et al., "A Stereoscopic Video See-through Augmented Reality System Based on Real-time Vision-based Registration." Virtual Reality, 2000. Proceedings. IEEE. IEEE, 2000.*

Tuceryan, Mihran, et al., "Calibration requirements and procedures for a monitor-based augmented reality system." Visualization and Computer Graphics, IEEE Transactions on 1.3 (1995): 255-273.*

Kuhl, Scott A., William B. Thompson, and Sarah H. Creem-Regehr., "HMD Calibration and Its Effects on Distance Judgments." ACM Transactions on Applied Perception (TAP) 6.3 (2009): 19.*

Whitaker, Ross T., et al. "Object calibration for augmented reality." Computer Graphics Forum. vol. 14. No. 3. Blackwell Science Ltd, 1995.*

Fuhrmann, Anton, Dieter Schmalstieg, and Werner Purgathofer. Practical calibration procedures for augmented reality. Springer Vienna, 2000.*

Kato et al., "Marker Tracking and HMD Calibration for a Video-based Augmented Reality Conferencing System.", (IWAR'99) Proceedings, IEEE, 1999.

Kanbara et al., "A Stereoscopic Video See-through Augmented Reality System Based on Real-time Vision-based Registration.", Virtual Reality, 2000. Proceedings IEEE, 2000.

Kato et al., "Virtual Object Manipulation on a Table-Top AR Environment," IEEE, 2000, pp. 111-119.

Tuceryan et al., "Calibration Requirements and Procedures for a Monitor-Based Augmented Reality System," IEEE, Jul. 6, 1995, pp. 1-31, Munich, Germany.

Whitaker et al., "Object Calibration for Augmented Reality," European Computer-Industry Research Centre, 1995, pp. 1-22.

Kuhl et al., "HMD calibration and its effects on distance judgments," Association for Computing Machinery, Inc., Aug. 2008, pp. 15-22, Los Angeles, California.

Canadian Office Action for Canadian Application No. 2,825,834 dated Nov. 18, 2015.

Canadian Office Action for Canadian Application No. 2,825,834 dated Feb. 4, 2015.

* cited by examiner

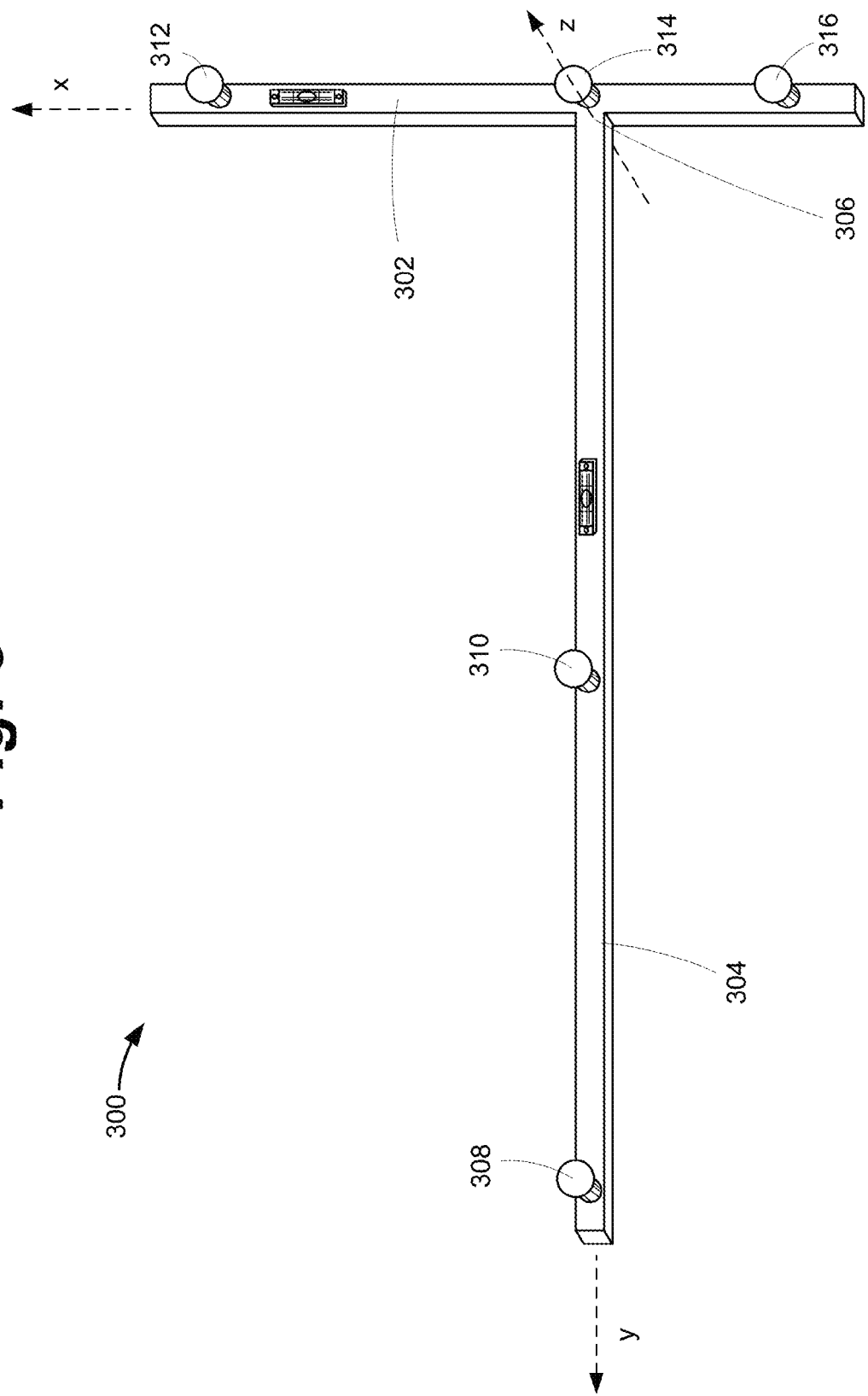

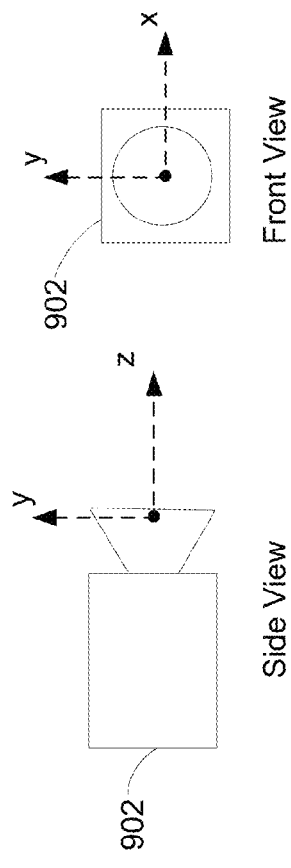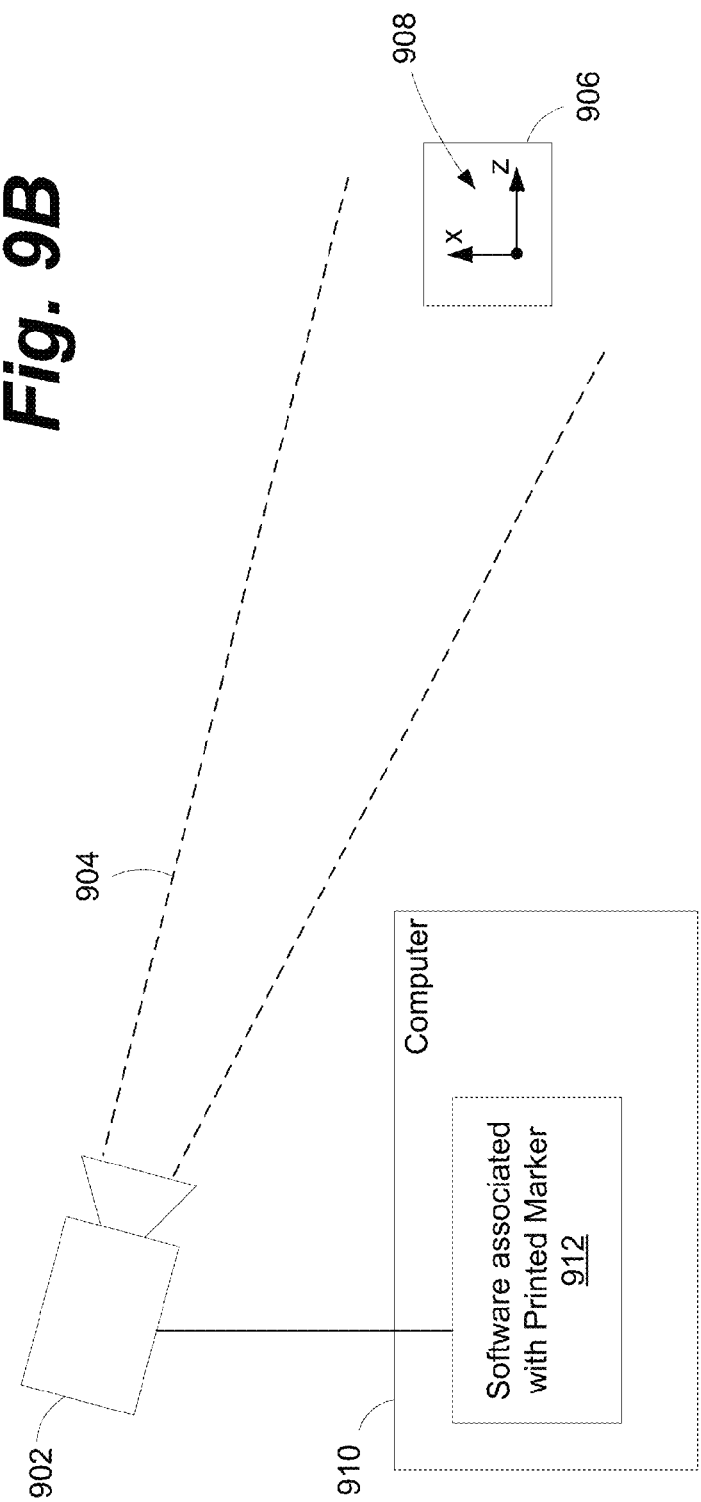

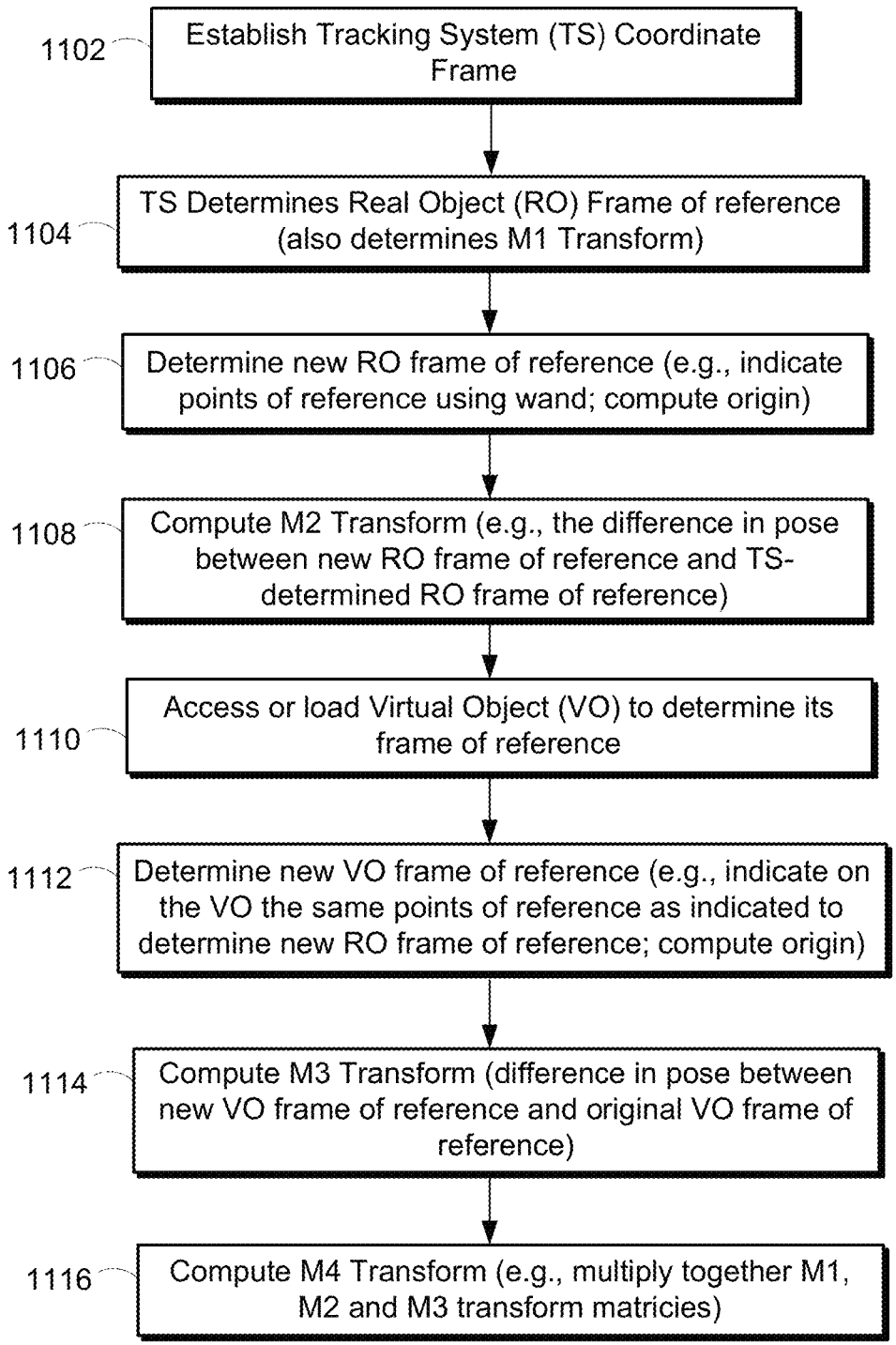

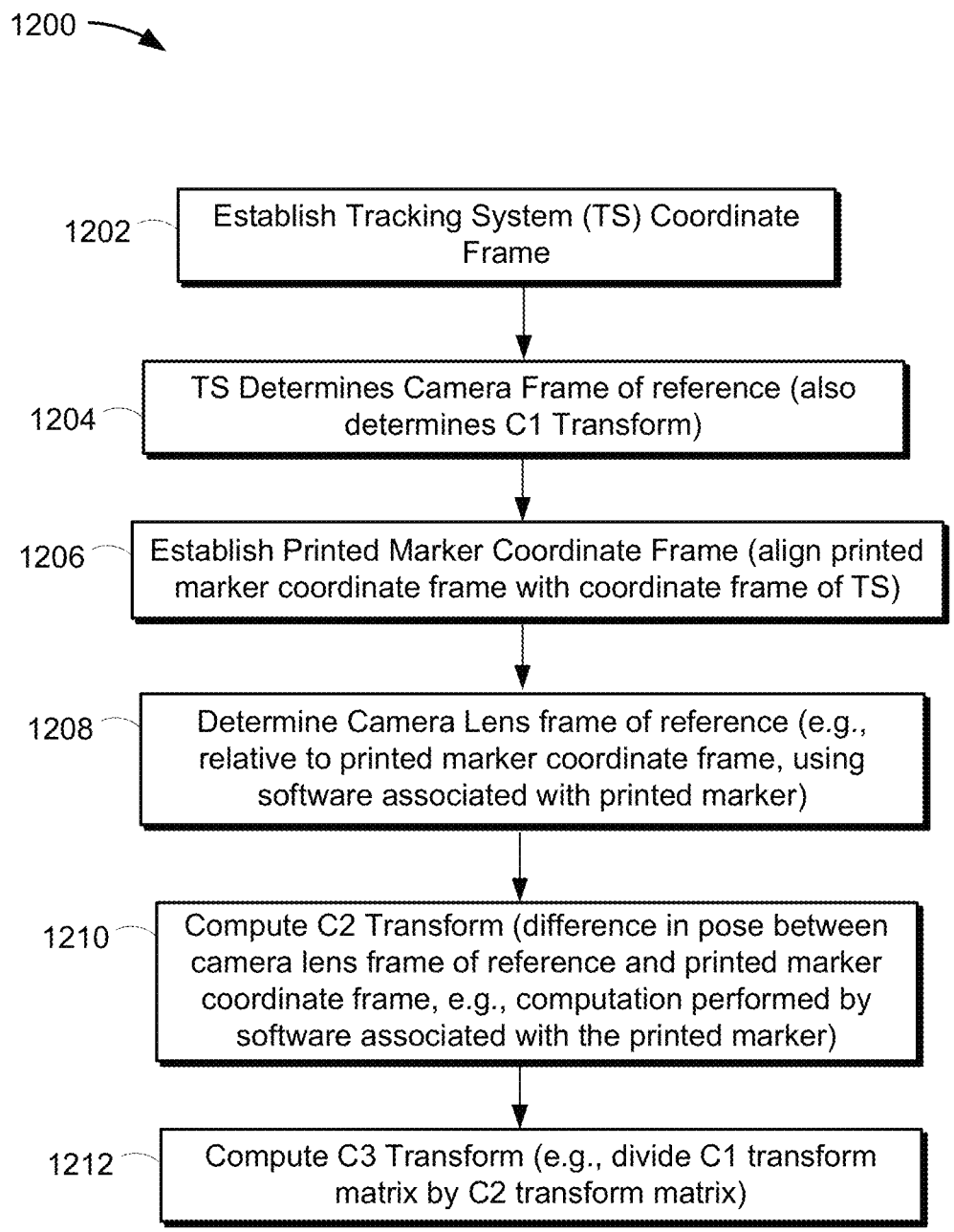

AUTOMATED FRAME OF REFERENCE CALIBRATION FOR AUGMENTED REALITY

FIELD

The present disclosure relates to augmented reality, and more particularly to one or more systems, methods, routines and/or techniques for automated frame of reference calibration for augmented reality.

BACKGROUND

Augmented Reality (AR) augments or adds to the perception of a real-world view, for example, a live video feed, by superimposing virtual objects or media into the real-world view. Augmented Reality allows for artificial or simulated information related to the real-world and its objects to be overlaid on the real-world view. Augmented reality is related to, but different than, virtual reality (VR), which replaces a real world view with an artificial or simulated view. Augmented Reality has been used in applications such as entertainment, video games, sports and cell phone applications.

Further limitations and disadvantages of conventional and traditional approaches will become apparent to one of skill in the art, through comparison of such systems with some aspects of the present invention as set forth in the remainder of the present application and with reference to the drawings.

SUMMARY

The present disclosure describes one or more systems, methods, routines and/or techniques for automated frame of reference calibration for augmented reality. One or more systems, methods, routines and/or techniques may allow for simple and quick calibration of an Augmented Reality (AR) system, for example, by automatically calibrating the frames of reference of virtual objects and/or a camera.

One or more embodiments of the present disclosure describe a method for augmented reality, for example, executed by a data processing system having at least one processor. The method may include receiving or establishing a tracking system coordinate frame associated with an object tracking system. The tracking system coordinate frame may be aligned with a real 3D space. The tracking system may track the position and orientation in a real 3D space of a real object and of a camera. The method may include receiving from the tracking system a first real object frame of reference for the real object. The first real object frame of reference may indicate a position and orientation of the real object relative to the tracking system coordinate frame. The method may include determining a second real object frame of reference for the real object. The second real object frame of reference may indicate a position and orientation of the real object relative to the tracking system coordinate frame. The method may include receiving a first virtual object frame of reference for a virtual object. The virtual object may be modeled after the real object. The first virtual object frame of reference may be unrelated to the tracking system coordinate frame. The method may include determining a second virtual object frame of reference for the virtual object. The second virtual object frame of reference may indicate a position and orientation of the virtual object relative to the tracking system coordinate frame. The method may include determining a virtual object mapping between the first virtual object frame of reference and the tracking system coordinate frame. The method may include displaying an augmented scene including a view of the real 3D space, a view of the real object and one or more overlaid virtual items. The virtual object mapping may be used to place the one or more overlaid virtual items in the augmented scene such that the one or more virtual items are aligned with the real object.

One or more embodiments of the present disclosure describe a method for augmented reality, for example, executed by a data processing system having at least one processor. The method may include receiving or establishing a tracking system coordinate frame associated with an object tracking system. The tracking system coordinate frame may be aligned with a real 3D space. The tracking system may track the position and orientation in a real 3D space of a camera that captures the real 3D space and a printed marker. The method may include receiving from the tracking system a camera frame of reference for the camera. The camera frame of reference may indicate a position and orientation of the camera relative to the tracking system coordinate frame. The method may include receiving or establishing a printed marker coordinate frame associated with the printed marker. The printed marker coordinate frame may be aligned with the real 3D space. The printed marker coordinate frame may be aligned with the tracking system coordinate frame. The method may include determining a camera lens frame of reference for the lens of the camera. The camera lens frame of reference may indicate a position and orientation of the camera lens relative to the printed marker coordinate frame. The method may include determining a camera lens mapping between the camera frame of reference and the camera lens frame of reference. The method may include displaying an augmented scene including a view of the real 3D space and one or more virtual items. The camera lens mapping may be used to alter or distort the one or more virtual items in the augmented scene.

One or more embodiments of the present disclosure describe a system. The system may include a camera that captures a view of a real 3D space including a real object. They system may include a tracking system that tracks the position and orientation in a real 3D space of the real object and of the camera. The tracking system may be configured to establish a tracking system coordinate frame associated with the tracking system, and the tracking system coordinate frame may be aligned with the real 3D space. The system may include a computer coupled to the camera and the tracking system, and the computer may include one or more memory units. The computer may be configured with a virtual modeler. The virtual modeler may be configured to receive from the tracking system a first real object frame of reference for the real object, where the first real object frame of reference may indicate a position and orientation of the real object relative to the tracking system coordinate frame. The virtual modeler may be further configured to compute a second real object frame of reference for the real object, where the second real object frame of reference may indicate a position and orientation of the real object relative to the tracking system coordinate frame. The virtual modeler may be further configured to receive from the one or more memory units a first virtual object frame of reference for a virtual object, where the virtual object may be modeled after the real object, and where the first virtual object frame of reference may be unrelated to the tracking system coordinate frame. The virtual modeler may be further configured to compute a second virtual object frame of reference for the virtual object, where the second virtual object frame of reference may indicate a position and orientation of the virtual object relative to the tracking system coordinate frame. The virtual modeler may be further configured to compute a virtual object mapping between the first virtual object frame of reference and the tracking system coordinate frame. The virtual modeler may be further configured to generate and store in the one or more memory units an augmented scene including a view of the real 3D space, a view of the real object and one or more overlaid virtual items. The virtual object mapping may be used to place the one or more overlaid virtual items in the augmented scene such that the one or more virtual items are aligned with the real object.

One or more embodiments of the present disclosure describe a data processing system that includes one or more memory units that store computer code and one or more processor units coupled to the one or more memory units. The one or more processor units may execute the computer code stored in the one or more memory units to receive or establish a tracking system coordinate frame associated with an object tracking system. The tracking system coordinate frame may be aligned with a real 3D space. The tracking system may track the position and orientation in a real 3D space of a camera that captures the real 3D space and a printed marker. The one or more processor units may execute the computer code stored in the one or more memory units to receive from the tracking system a camera frame of reference for the camera. The camera frame of reference may indicate a position and orientation of the camera relative to the tracking system coordinate frame. The one or more processor units may execute the computer code stored in the one or more memory units to receive or establish a printed marker coordinate frame associated with the printed marker. The printed marker coordinate frame may be aligned with the real 3D space, and the printed marker coordinate frame may be aligned with the tracking system coordinate frame. The one or more processor units may execute the computer code stored in the one or more memory units to determine a camera lens frame of reference for the lens of the camera. The camera lens frame of reference may indicate a position and orientation of the camera lens relative to the printed marker coordinate frame. The one or more processor units may execute the computer code stored in the one or more memory units to determine a camera lens mapping between the camera frame of reference and the camera lens frame of reference. The one or more processor units may execute the computer code stored in the one or more memory units to display an augmented scene including a view of the real 3D space and one or more virtual items. The camera lens mapping may be used to alter or distort the one or more virtual items in the augmented scene.

These and other advantages, aspects and novel features of the present disclosure, as well as details of an illustrated embodiment thereof, will be more fully understood from the following description and drawings. It is to be understood that the foregoing general descriptions are exemplary and explanatory only and are not restrictive of the disclosure as claimed.

BRIEF DESCRIPTION OF THE DRAWINGS

Several features and advantages are described in the following disclosure, in which several embodiments are explained, using the following drawings as examples.

FIG. 3 depicts an illustration of a tool or wand used for various reasons by a tracking system, according to one or more embodiments of the present disclosure.

FIGS. 9A and 9B depict illustrations of how a printed marker may allow for determination of a frame of reference of a camera lens.

FIG. 11 depicts a flow diagram that shows example steps in a method for automated frame of reference calibration for augmented reality, according to one or more embodiments of the present disclosure.

FIG. 12 depicts a flow diagram that shows example steps in a method for automated frame of reference calibration for augmented reality, according to one or more embodiments of the present disclosure.

DETAILED DESCRIPTION

Figure 1:
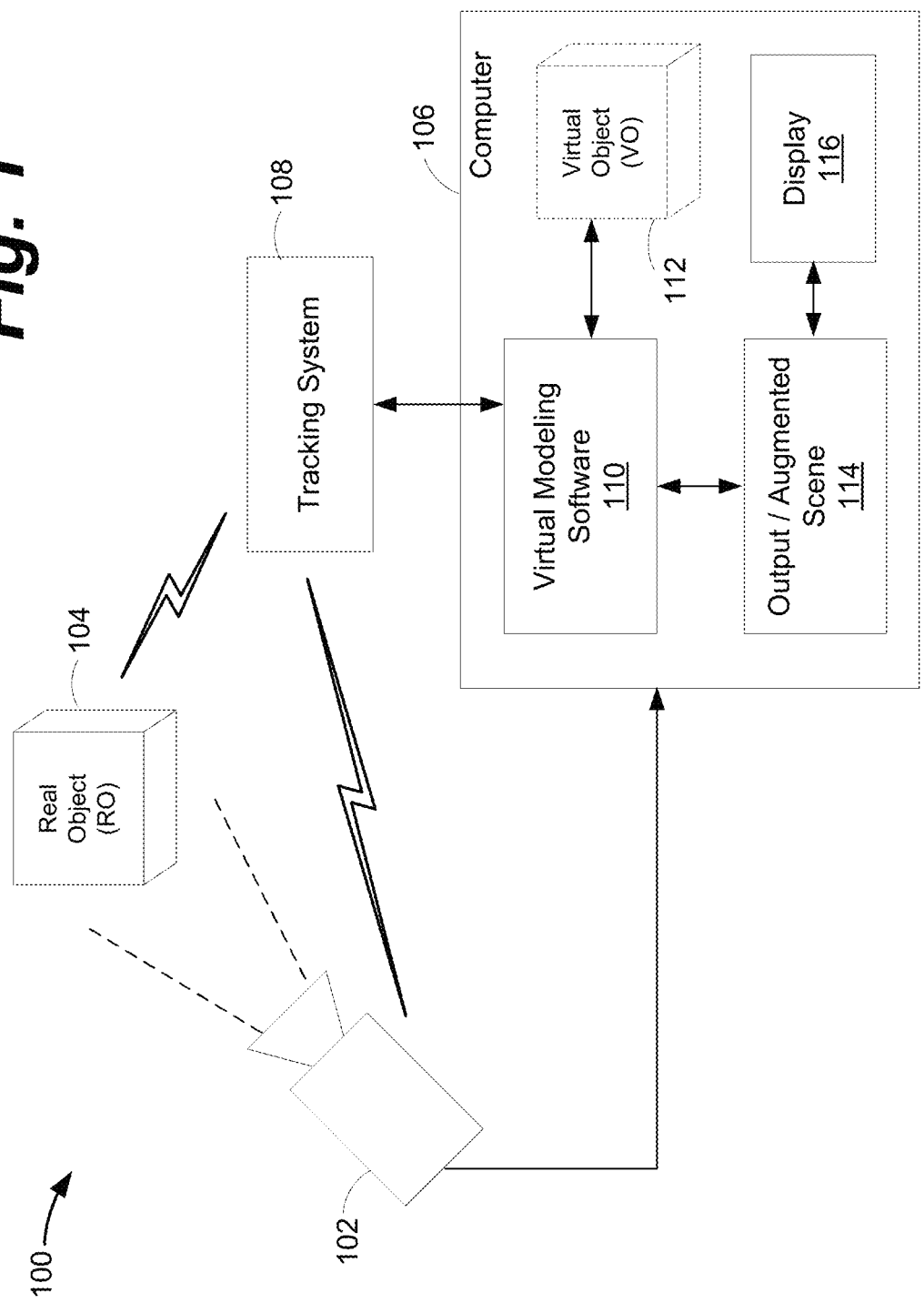
FIG. 1 depicts a block diagram showing example devices, components, software and interactions of an augmented reality (AR) system, according to one or more embodiments of the present disclosure, where the automated frame of reference calibration techniques discussed herein may be useful in such an AR system.

In various AR systems a tracking system may be used to track the position and orientation of a camera and various real world objects in a 3D space. For example, a tracking system may track a camera and a piece of machinery that the camera is viewing/capturing. Various AR systems may attempt to create an augmented scene that includes a real world scene as captured by the camera (including various real world objects) and overlaid virtual media and/or objects. To create the augmented scene, the tracking system may establish a virtual coordinate frame and may track or "place" representations of the real world objects in this coordinate frame. Various AR systems may attempt to "place" various virtual objects (e.g., CAD models/objects) in the coordinate frame in order to create an augmented scene. Virtual objects/models may have their own default or arbitrary frame of reference (e.g., 3D position and orientation), and thus, to place a virtual object in the coordinate frame of the tracking system, a mapping or transform must be determined between the coordinate frame of the tracking system and the virtual object frame of reference. Additionally, if the camera (e.g., the camera capturing the real world scene) moves, an AR system may attempt to alter the view of the virtual objects. In order to do this with precision, an AR system may need to track the position and orientation of the camera lens. However, a tracking system may only track the position and orientation of the whole camera. Various software programs (e.g., in conjunction with other parts) may be used to determine a frame of reference for the camera lens in a coordinate frame, but these lens software programs may track the lens in a coordinate frame established by the lens software program. Therefore, to place the camera lens in the coordinate frame of the tracking system, a mapping or transform must be determined between the coordinate frame of the tracking system and the lens frame of reference. Determining these mappings and/or transforms (e.g., for the virtual objects and/or for the camera lens) may be referred to as AR system calibration or calibrating frames of reference.

It should be understood that the terms "coordinate frame," "frame of reference," "reference frame," and "pose" may be used throughout this disclosure and may be closely related. The term "coordinate frame" may refer to a 3D representation of a 3D space, where the coordinate frame includes three planes or axes (e.g., an X-axis, a Y-axis, a Z-axis) and an origin (e.g., a point where the three axes intersect. The term "frame of reference" or "reference frame" may refer to a 3D location and 3D orientation of an object or point, for example, in a coordinate frame. The frame of reference of an object may include an origin (e.g., an approximate center of mass) for the object and an orientation of the object (e.g., 3 axes established relative to the object). The term "pose" is short for "position and orientation" and may refer to a 3D position (e.g., X, Y, Z coordinates) and a 3D orientation (e.g., roll, pitch, yaw) of an object in 3D space.

Various AR systems may perform AR system calibration through a manual or trial-and-error process, for example, approximating the frame of reference of the virtual model and/or the camera lens relative to the tracking system coordinate frame and then testing the augmented scene to determine whether the approximation was a good one. For example, a technician may simply look at the overlaid virtual objects in the augmented scene and make a determination regarding whether they appear to be in their correct location from various camera locations and orientations. This manual calibration process may require manipulation of twelve parameters, for example, six parameters for a virtual object (e.g., X, Y, Z coordinates and roll, pitch, yaw) and six parameters for a camera lens (e.g., X, Y, Z coordinates and roll, pitch, yaw). This process may be expensive and/or time intensive, for example, taking many hours (e.g., more than 8 hours) to complete. Even when the manual calibration process is complete, it still may not result in a precise solution/calibration. For example, a virtual object that appears to be properly placed from one camera pose may not appear to be properly placed from different poses. Small errors in virtual object placement can lead to large errors on larger real world objects. Additionally, each time the AR system is set up in a new environment or for a new real object or camera, the AR system must be manually calibrated.

The present disclosure describes one or more systems, methods, routines and/or techniques for automated frame of reference calibration for augmented reality. One or more systems, methods, routines and/or techniques may allow for simple and quick calibration of an Augmented Reality (AR) system, for example, by automatically calibrating the frames of reference of virtual objects and/or a camera. One or more systems, methods, routines and/or techniques may allow for setup of the AR system in a new environment or on a new real object (e.g., a piece of machinery) in a relatively short amount of time (e.g., less than 15 minutes) and may allow for accurate alignment of overlaid virtual content with a real world scene. Accurate alignment of virtual content may be critical if the AR system is being used to instruct a technician to perform a precise task, for example, drilling a small hole in a precise location. One or more systems, methods, routines and/or techniques may determine and/or compute mappings or transforms between various frames of reference (e.g., the coordinate frame of the tracking system, the frame of reference of a virtual object and the frame of reference of a camera lens). The present disclosure may describe two main calibration routines and/or techniques. The first calibration routine and/or technique may determine and/or calculate a mapping or transform between a frame of reference of a virtual object (e.g., a CAD model) and a coordinate frame associated with the tracking system. The second calibration routine and/or technique may determine and/or calculate a mapping or transform between a camera lens frame of reference and a frame of reference of the whole camera as determined by a tracking system. These routines and/or techniques may calibrate an AR system to provide rapid, precise alignment between virtual content and a live camera view of a real scene.

FIG. 1 depicts a block diagram showing example devices, components, software and interactions of an augmented reality (AR) system 100, according to one or more embodiments of the present disclosure, where the automated frame of reference calibration techniques discussed herein may be useful in such an AR system. AR system 100 may include a camera 102 that may capture and/or stream a live video feed of a real-world scene. The real-world scene may include one or more real objects, for example, real object (RO) 104. RO 104 may be one of various objects, for example, a tool, a piece of machinery, a large satellite, a control box, a control panel or various other objects. The camera 102 may be in communication with a computer 106, where the computer may interpret and/or process information (e.g., live streaming video) sent from the camera related to real-world scenes and/or objects captured by the camera.

The AR system 100 may include a tracking system 108. The tracking system 108 may track the "pose" (position and orientation in 3D space) of the real object 104 and the camera 102, and may stream this information (e.g., in real time) to a computer (e.g., computer 106) or other component. The tracking system 108 may include various components, for example, a number of tracking markers, a number of sensing devices to sense the tracking markers and a base computing device that may run associated tracking system software. In one example, each marker may be a small sphere (e.g., a 10 mm sphere) with a reflective coating that is designed to reflect certain wavelengths of light. In this example, the markers may be placed in various places and/or on various objects in the real-world space such that the tracking system 108 may track the position and/or orientation of certain points and/or objects in 3D space. For example, a number (e.g., three or more) of tracking markers may be placed on the real object 104, and a number (e.g., three or more) of tracking markers may be placed on the camera 102.

The sensing devices of the tracking system 108 may be cameras that are designed to detect the location in 3D space of the tracking markers. For example, each camera may be an infrared camera that is designed to detect reflections from various tracking markers (e.g., tracking markers placed on the camera 102 and on the real object 104). The various sensing devices (e.g., infrared cameras) may be placed and/or mounted at various locations around the 3D space, for example, a number (e.g., eight or more) of cameras may be mounted on the walls of a room or lab, for example, mounted in an arrangement such that the 3D space of interest is amply covered by the viewing ranges of the various cameras. The various sensing devices of the tracking system 108 may be in communication (e.g., by a real time communication link such as Ethernet, WiFi or the like) with a base computing device, where the base computing device may run associated tracking system software. The tracking system software may process data from the various sensing devices. The tracking system 108 may be in communication (e.g., by a real time communication link such as Ethernet, WiFi or the like) with a computer 106. The computer may be the computer that is in communication with the camera 102. In some embodiments, the base computing device of the tracking system 108 may be the same computing device as computer 106.

In some embodiments, the camera 102 may be integrated into computer 106. In some examples, computer 106 may be a mobile device, for example, a tablet computer, smartphone, PDA or the like. As one specific example, computer 106 may be a tablet computer (see FIG. 7C for an example) with an integrated camera. A mobile device with an integrated camera may provide flexibility and freedom of movement to a user. For example, a user could view an augmented scene that includes a real object (e.g., a real piece of machinery), and the user could walk around the real object, viewing different parts and/or angles of the real object. Additionally, the user may see virtual content on the screen of the table that aids the user in performing a task, for example, virtual content may include instructions, arrows, hardware, tools or the like that may instruct the user how to work on or with the real object. The tablet computer in this example (e.g., computer 106) may include the virtual modeling software 110. The tablet computer in this example, may be in communication (e.g., by a real time communication link such as Ethernet, WiFi or the like) with the tracking system 108 (e.g., the base computing device of the tracking system).

Computer 106 may include virtual modeling software 110. The virtual modeling software may access or load various virtual objects, for example, virtual object (VO) 112. Virtual objects (e.g., VO 112) may be created and designed in one of various known ways to create virtual and/or computer-aided design (CAD) objects and/or models. Virtual/CAD objects/models may be created using CAD software, for example, software that uses vector based graphics or the like to depict an object, for example, an object modeled after a real world object. Virtual/CAD objects/models may be 3D objects that account for, in detail, the various 3D features of the real world object. Virtual object 112 may be a virtual representation of the real object 104. Computer 106 may access or load various other virtual objects besides just virtual objects that represent real objects in the real-world space. As one example, real object 104 may be a piece of machinery, and virtual object 112 may be a virtual representation of the same piece of machinery. Additionally, other virtual objects may have no counterpart in the real world space, for example, virtual objects could represent hypothetical screws, tools, wires and the like that show a technician how to interact with the real object 104.

The virtual modeling software 110 may receive data (e.g., streaming real time data) from the tracking system 108, for example, the coordinate system established by the tracking system, the frame of reference of the camera 102 and the frame of reference of a real object 104. The virtual modeling software 110 may perform various routines, techniques and the like described herein to create an augmented scene (e.g., augmented scene 114), for example, a real time view of the real world space as captured by the camera 102 augmented and/or overlaid with virtual objects. The virtual modeling software 110 may perform various calibration routines and/or techniques as described herein to align the coordinate frames and frames of reference of virtual objects and a camera lens to with the coordinate frame associated with the tracking system. Once calibration is achieved, the virtual modeling software 110 may maintain correlation and/or alignment between various virtual objects and a live real world scene. The computer 106 may include or be in communication with a display 116 that may display the augmented scene 114 to a user. The virtual modeling software 110 may produce an augmented scene 114 (displayed on display 116) that shows virtual objects placed on a live video feed. The virtual modeling software 110 may appropriately deform (e.g., alter 3D location, 3D orientation, and/or 3D size) virtual objects in the augmented scene, for example, depending upon the pose of the camera 102 relative and/or the pose of the real object 104. For example, if the camera 102 moves further away from the real object 104, one or more virtual objects in the augmented scene may shrink. As another example, if the camera 102 moves closer to the real object 104, one or more virtual objects would enlarge. As another example, if the camera 102 moves at an angle relative to the real object 104, one or more virtual objects would rotate appropriately.

Figure 2:
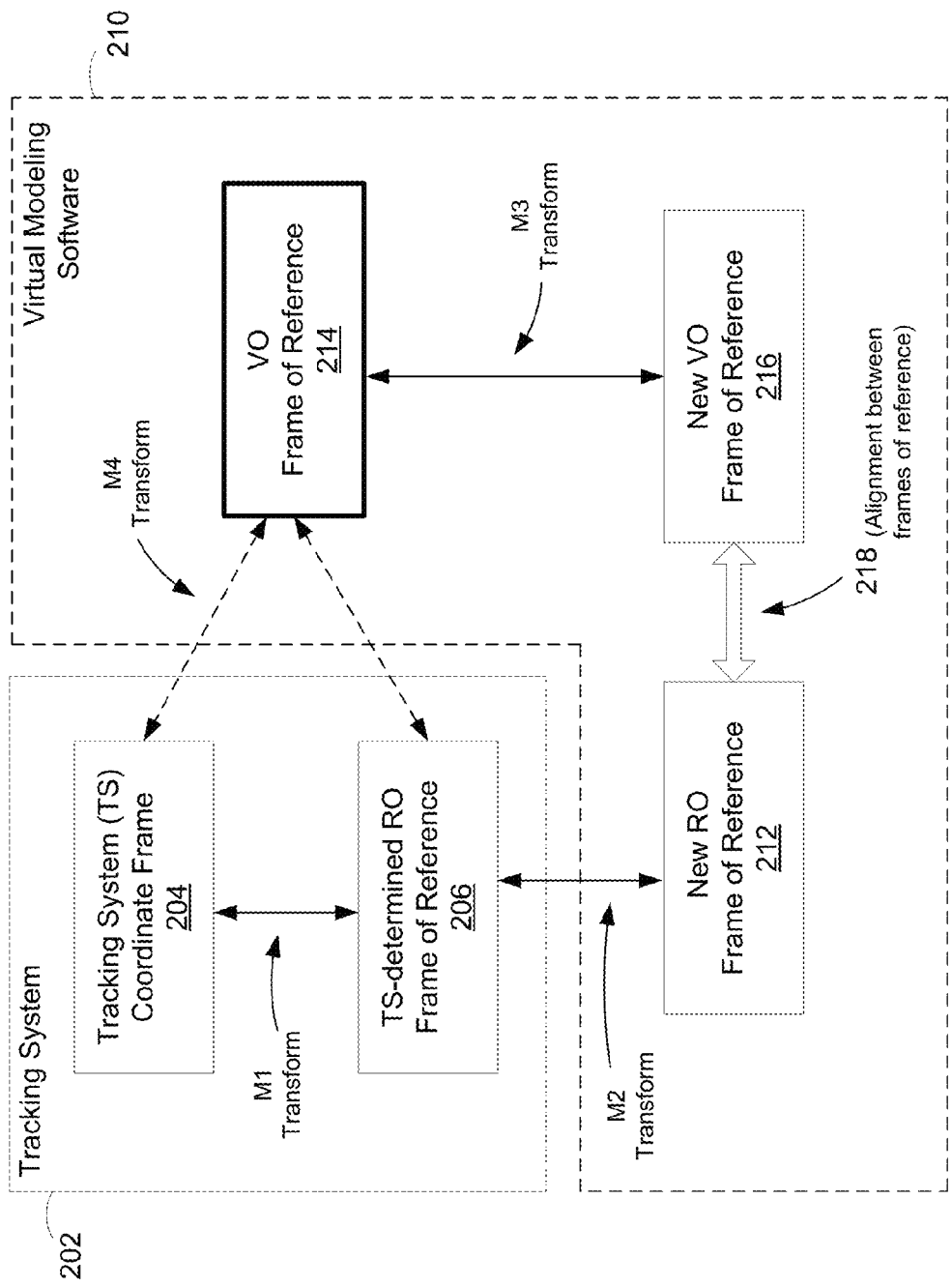
FIG. 2 depicts a block diagram showing an example calibration technique, according to one or more embodiments of the present disclosure.

FIG. 2 depicts a block diagram showing an example calibration technique, according to one or more embodiments of the present disclosure. More specifically, FIG. 2 shows an automated frame of reference calibration technique that may be used to determine and/or calculate a mapping or transform between the frame of reference of virtual objects (e.g., virtual objects added to an augmented scene) and the frame of reference associated with the tracking system. As can be seen in FIG. 2, a tracking system 202 (e.g., similar to tracking system 108 of FIG. 1) may establish a coordinate frame 204, for example, as part of a tracking system setup performed by a technician. The coordinate frame of the tracking system may include three axes (e.g., X-axis, Y-axis, Z-axis) and an origin where the three axes intersect. The tracking system may "place" or associate the origin of the coordinate frame with a particular point in a real-world 3D space and may orient the coordinate frame relative to the real world 3D space. The tracking system may utilize a tool or wand to establish its coordinate frame, for example, a wand similar to the wand 300 shown in FIG. 3. Referring to FIG. 3, the wand 300 may resemble the letter "T" and may include a first extended member (e.g., member 302) that may designate a first axis (e.g., X-axis) and may include a second extended member (e.g., member 304) that may designate a second axis (e.g., Z-axis). The wand 300 may also designate an origin at the point 306 where the first member 302/axis and the second member 304/axis intersect. A third imaginary axis (e.g., Y-axis) may run through the origin point 306. As one example, the wand 300 may be placed on the floor of a room or lab, and the tracking machine may establish its coordinate frame by detecting the wand and/or tracking markers (e.g., tracking markers 308, 310, 312, 314, 316) attached to the wand. The tracking system may establish a virtual origin and three virtual axes that associate with the origin and axes as designated by the wand 300. Once the tracking system coordinate system is established, the tracking system may track a real object (e.g. equipped with three or more tracking markers) in the room or lab and determine its pose within the coordinate frame and determine the orientation of the object with respect to the three axes.

Figure 4B:
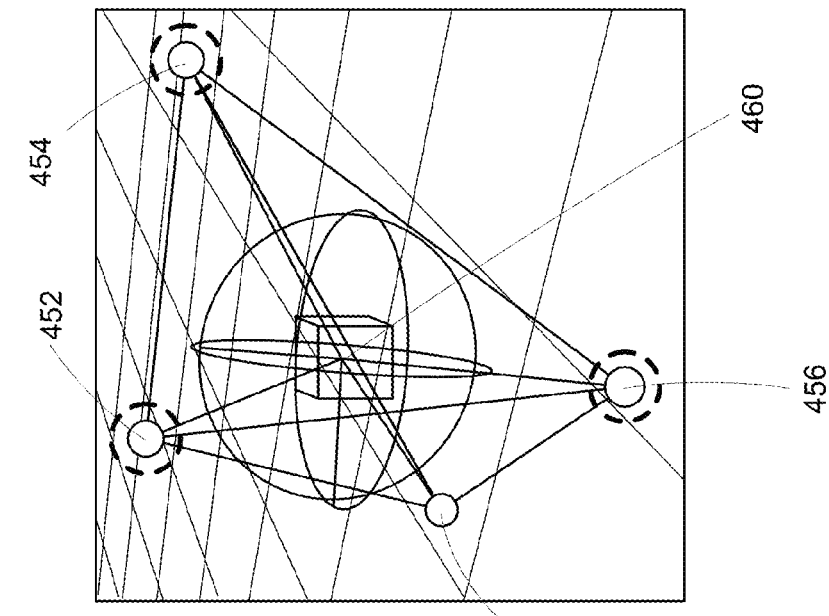
FIG. 4B depicts an illustration of how a tracking system may create and place a representation of a real object, according to one or more embodiments of the present disclosure.
Figure 4A:
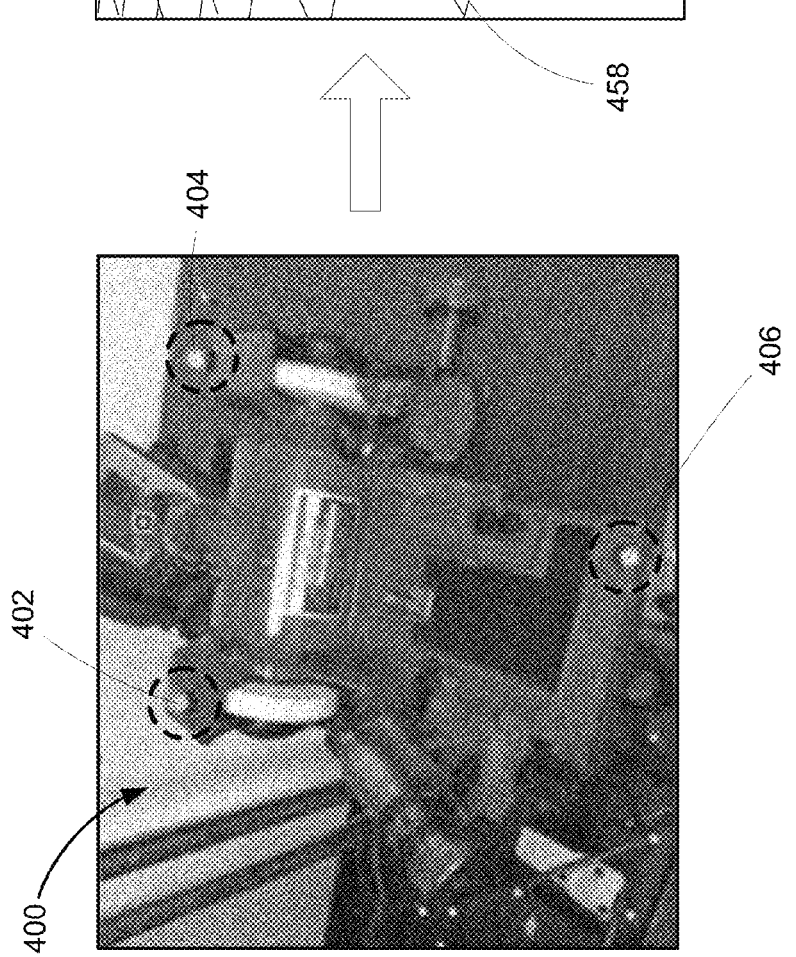
FIG. 4A depicts an illustration of an example real object with a number of tracking markers attached to or placed on the real object, according to one or more embodiments of the present disclosure.

Referring again to FIG. 2, the tracking system 202 may determine a frame of reference 206 for a real object. In other words, the tracking system 202 may track the real object. The real object may be similar to real object 104 of FIG. 1, for example. The real object (RO) may be one of various objects, for example, a tool, a piece of machinery, a large satellite, a control box, a control panel or various other objects. FIG. 4A shows an example of a real object 400—a drill sharpener tool. In order for the tracking system to track (i.e., determine a frame of reference for) the real object 400, a number (e.g., three or more) of tracking markers (e.g., tracking markers 402, 404, 406) may be attached to or placed on the real object 400. For proper tracking, the tracking markers may have to be placed appropriately on the real object 400, for example, in a non-collinear, non-symmetrical arrangement. Three or more points are said to be collinear if they lie on a single straight line. Thus, a non-collinear arrangement of tracking markers means that the tracking markers are arranges such that the markers do not all lie on a straight line. For proper tracking, at least three non-collinear tracking markers may be placed on the real object. More than three tracking markers may be placed on the real object, for example, to improve reliability and/or accuracy of calculations, for example, in case view of one of the tracking markers is obstructed.

The tracking system (e.g., including a number of infrared cameras) may detect the tracking markers and create and place a representation of the real object in the coordinate frame established by the tracking system. FIG. 4B shows an illustration of how a tracking system may create and place a representation of a real object. The tracking system may detect the location of the tracking markers (e.g., markers 402, 404, 406 and perhaps more markers not shown in FIG. 4A) and may create and place points (e.g., points 452, 454, 456 and 458), respectively associated with the tracking markers, in the coordinate frame of the tracking system. From these points (e.g., points 452, 454, 456 and 458), the tracking system may determine an origin (e.g., point 460) and an orientation (see cube and orientation lines that surround point 460) for the representation of the real object. The origin may be determined by calculating a centroid (e.g., a center of mass) of the points 452, 454, 456 and 458. The orientation may be set to match (or related to) the orientation of the coordinate system of the tracking system. Once the tracking system determines a frame of reference (e.g., an origin/location and orientation associated with the tracking system coordinate frame) for the real object (RO), the tracking system may stream information about the pose of the real object to the virtual modeling software. The streaming pose information about the real object may update in real time as the real object may move and/or rotate.

Referring again to FIG. 2, the virtual modeling software 210 may establish a new frame of reference 212 for the real object (RO). The virtual modeling software 210 may be similar to the virtual modeling software 110 of FIG. 1, for example. The virtual modeling 210 software may use the same coordinate frame as the one associated with the tracking system. The new RO frame of reference 212 may specify different (when compared to the RO frame of reference 206) points of reference on the real object and may determine and/or calculate a different origin. Establishing a new RO frame of reference may allow the virtual modeling software to choose points of reference on the real object that are the same (or very close to) points of reference on a virtual object (e.g., a CAD model) that is associated with the real object.

Figure 5:
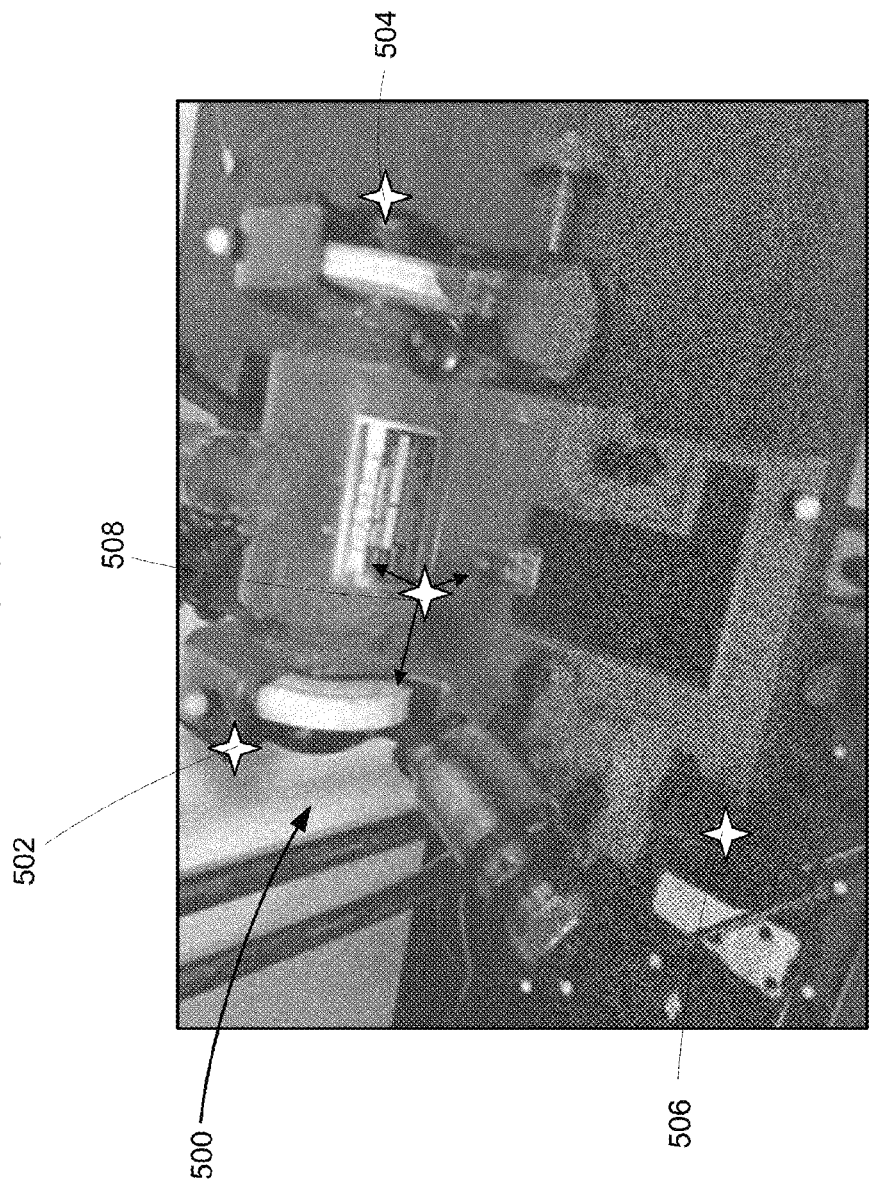
FIG. 5 depicts an illustration of how virtual modeling software may establish a new frame of reference for a real object, according to one or more embodiments of the present disclosure.

FIG. 5 shows an illustration of how the virtual modeling software may establish a new frame of reference for a real object, for example, real object 500. A number of points of reference (e.g., points 502, 504, 506) may be indicated on the real object 500. These points of reference may be indicated, for example, by a technician using a tool or wand, for example, a wand similar to the wand 300 of FIG. 3. The tool or wand may be trackable by the tracking system, for example, the position between the tracking markers attached to the wand relative to each other may be determined by the tracking system, allowing for accurate point collection. The virtual modeling software may use data from the tracking system about the wand position to record points of reference on the real object. As one example, the virtual modeling software may recognize a point on the wand as a "pointer" (e.g., a tip of an extending member of the wand). A technician may touch the pointer to various points on the real object (e.g., points 502, 504, 506), and via the wand and the tracking system, the virtual modeling software may capture or record these points and place them in the coordinate frame associated with the tracking system. To determine the new frame of reference, the points of reference may have to be placed appropriately on the real object 500, for example, in a non-collinear arrangement. At least three non-collinear points of reference may be placed on the real object. More than three points of reference may be placed on the real object, for example, to improve reliability and/or accuracy of calculations. From these points of reference (e.g., points 502, 504, 506), the virtual modeling software may determine an origin (e.g., point 508) and an orientation (see axes lines extending from point 508) for the real object. The origin may be determined by calculating a centroid (e.g., a center of mass) of the points 502, 504, 506. An orientation for the real object may be determined by placing two axes (e.g., X-axis, Z-axis) that extend from the origin in the plane created by points 502, 504, 506.

Referring again to FIG. 2, once the new RO frame of reference 212 is established, the virtual modeling software 210 may calculate translational and/or rotational differences between the new RO frame of reference 212 and the RO frame of reference 206 determined by the tracking system.

Referring to FIG. 2, the virtual modeling software 210 may access or load various virtual objects, for example, pre-designed CAD models. The virtual modeling software 210 may place the virtual objects in the coordinate frame associated with the tracking system, but the AR system may need to be calibrated before appropriate placement will work. A virtual object (e.g., a CAD model) may have its own frame of reference (e.g., an origin and three orientation axes), for example, as specified when the virtual object was designed. It may be the case (e.g., for a particular environment) that all virtual objects referenced by the virtual modeling software may share the same frame of reference (e.g., VO frame of reference 214). To place virtual objects in the coordinate frame associated with the tracking system, the virtual modeling software 210 may determine a mapping or transform between the VO frame of reference 214 of the virtual objects and the coordinate frame 204 associated with the tracking system. To calibrate the AR system (e.g., determine the mapping or transform), the virtual modeling software 210 may use a virtual object (e.g., virtual object 112 of FIG. 1) that corresponds to a real object (e.g., real object 104 of FIG. 1) that the camera (e.g., camera 102 of FIG. 1) of the AR system is capturing. This virtual object may have a VO frame of reference 214.

The virtual modeling software 210 may establish a new VO frame of reference 216 for the real virtual object. The virtual modeling 210 software may use the same coordinate frame as the one associated with the tracking system. The new VO frame of reference 216 may have a different origin and orientation, when compared to VO frame of reference 214. Establishing a new VO frame of reference may allow the virtual modeling software to choose points of reference on the virtual object that are the same (or very close to) points of reference as were indicated (as explained above) with respect to the corresponding real object, and may allow for alignment (see generally point 218) between the new RO frame of reference 212 and the new VO frame of reference 216. Alignment between the new RO frame of reference 212 (associated with the real object) and the new VO frame of reference 216 (associated with the virtual object) may be achieved, for example, by choosing the same points of reference on both the real object and the virtual object, and by performing the same origin and orientation calculation for each.

Figure 6:
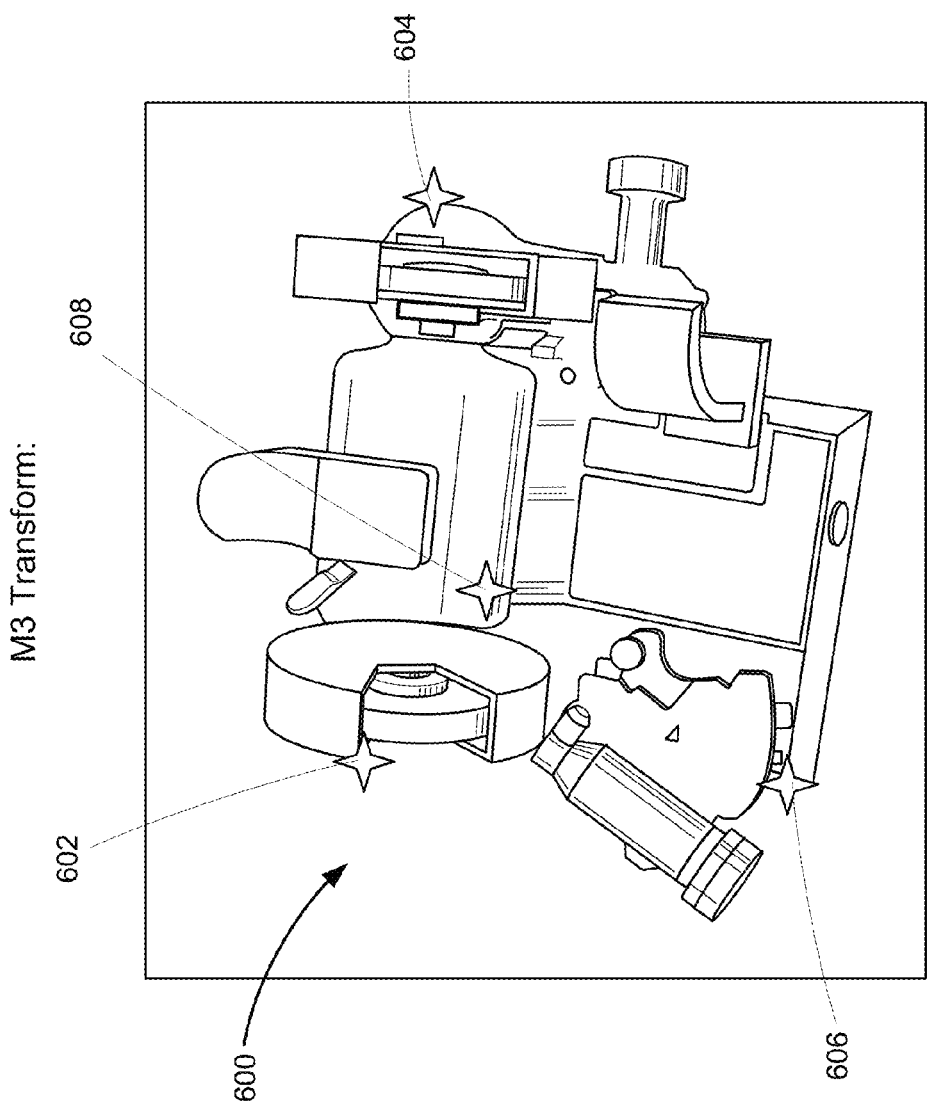
FIG. 6 depicts an illustration of how virtual modeling software may establish a new frame of reference for a virtual object, according to one or more embodiments of the present disclosure.

FIG. 6 shows an illustration of how the virtual modeling software may establish a new VO frame of reference for the virtual object, for example, virtual object 600. Note that, for calibration purposes, virtual object 600 may be a virtual object modeled after an associated real object that the camera of the AR system is capturing, for example, real object 500 of FIG. 5. A number of points of reference (e.g., points 602, 604, 606) may be selected on the virtual object 600. These points of reference may correspond (e.g., be in the same relative position as) to the points of reference that were chosen, indicated and/or recorded to create the new RO frame of reference (see FIG. 5 and related discussion). As with the RO frame of reference determination, the points of reference to determine the VO frame of reference may be non-collinear arrangement, and at least three non-collinear points of reference may be selected on the virtual object. From these points of reference (e.g., points 602, 604, 606), the virtual modeling software may determine an origin (e.g., point 608) and an orientation (see axes lines extending from point 608) for the virtual object. The origin may be determined by calculating a centroid (e.g., a center of mass) of the points 602, 604, 606. An orientation for the virtual object may be determined by placing two axes (e.g., X-axis, Z-axis) that extend from the origin in the plane created by points 602, 604, 606.

Referring again to FIG. 2, once the new VO frame of reference 216 is established, the virtual modeling software 210 may calculate translational and/or rotational differences between the new VO frame of reference 216 and the VO frame of reference 214 associated with the virtual object.

As explained above, a virtual object that is modeled after an associated real object in the 3D space may be required to calibrate the AR system, for example, to determine a new VO frame of reference 216 that may be aligned with the new RO frame of reference 212. However, once calibration is complete, it should be understood that various other virtual objects may be placed (e.g., by the virtual modeling software) into the coordinate frame associated with the tracking system. Referring to FIG. 2, it may be seen why this placement works. To place a virtual object into the coordinate frame associated with the tracking system, a mapping or transform (e.g., the M4 Transform shown in FIG. 2) must be determined between the virtual object frame of reference 214 (e.g., an origin and orientation) and the coordinate frame 204 associated with the tracking system. The M4 transform may not be known before the calibration process is complete. The calibration process, as explained above, may determine various other mappings or transforms that are related to the M4 transform. As shown in FIG. 2, the calibration process may determine the M1 Transform (i.e., where the tracking system places the tracked real object in its coordinate frame), the M2 Transform (i.e., the translational and rotational differences between the RO frame of reference 206 and the new RO frame of reference 212) and the M3 Transform (i.e., the translational and rotational differences between the VO frame of reference 214 and the new VO frame of reference 216). Once the M1, M2 and M3 transforms are known, the M4 transform may be calculated. Once the M4 transformation is known, various virtual objects may be placed in the coordinate frame associated with the tracking system. Additionally, as information (e.g., pose of the real object) from the tracking system is streamed to the virtual modeling software, if the M1 transform changes (i.e., the pose of the real object in 3D space), the M4 transform may update, for example, in real time. In this respect, virtual objects may overlay on a real world scene, and the appearance of the virtual objects may change appropriately, for example, as an associated real object in the scene moves.

The following explains one example technique to compute the M4 transform, as shown in FIG. 2. The various transforms (M1, M2, M3, M4) as shown in FIG. 2 may each be represented as a transform matrix, for example, a 4×4 transformation matrix as is commonly used in 3D computer graphics. The M1 transform may be represented as the transform matrix shown in Eq. 1 below. The M2 transform may be represented as the transform matrix shown in Eq. 2 below. The M3 transform may be represented as the transform matrix shown in Eq. 3 below.

$$M_1 = \begin{bmatrix} DCM_1 & v_1 \\ 000 & 1 \end{bmatrix} \quad \text{(Eq. 1)}$$

$$M_2 = \begin{bmatrix} DCM_2 & v_2 \\ 000 & 1 \end{bmatrix} \quad \text{(Eq. 2)}$$

$$M_3 = \begin{bmatrix} DCM_3 & v_3 \\ 000 & 1 \end{bmatrix} \quad \text{(Eq. 3)}$$

Each transform matrix may include a rotational or orientation component ($DCM_n$ or "Direction Cosine Matrix") and a translational or location component ($v_n$). For example, $DCM_n$ represents the rotational matrix for the $M_n$ transform, and $V_n$ represents the translational vector for the $M_n$ transform. The rotational component ($DCM_n$) may be a 3×3 matrix that represents a change in orientation between two objects. The $DCM_n$ component may represent three values—a change in roll (e.g., rotation about an X-axis), a change in pitch (e.g., rotation about a Y-axis), and a change in yaw (e.g., rotation about a Z-axis). These three values may be expanded out into a 3×3 $DCM_n$ matrix to fit properly into the 4×4 transform matrix $M_n$. A person familiar with transform matrices and matrix multiplication will realize that a transform matrix must be populated in an appropriate manner such that multiplication of one matrix by the other results in the desired transformation. The translational component ($v_n$) may be a 1×3 matrix (i.e., 3 numbers in a vertical column) that represents the change in location of two objects (e.g., change in location between origins of two objects). The translational component ($v_n$) may include three values—a change in 3D location relative to the X-axis, a change in 3D location relative to the Y-axis and a change in 3D location relative to the Z-axis. When the rotational component ($DCM_n$) and translational component ($v_n$) is added to the transform matrix ($M_n$) and padded with "0001" in the bottom row (to make the matrix multiplication work), the transform matrix is complete.

The M4 transform may then be calculated as shown in Eq. 4 below, resulting in the M4 transform shown in Eq. 5 below.

$$M_4 = \begin{bmatrix} DCM_1 & v_1 \\ 000 & 1 \end{bmatrix} \begin{bmatrix} DCM_2 & v_2 \\ 000 & 1 \end{bmatrix} \begin{bmatrix} DCM_3 & v_3 \\ 000 & 1 \end{bmatrix} \quad \text{(Eq. 4)}$$

$$M_4 = \begin{bmatrix} DCM_4 & v_4 \\ 000 & 1 \end{bmatrix} \quad \text{(Eq. 5)}$$

In some embodiments, once the M4 transform is calculated, it remains the same. As can be seen in FIG. 2, once the M4 transform is calculated, it may represent the transform from a virtual object frame of reference to the TS-determined RO Frame of Reference. The M4 transform may be used to place various virtual objects in a coordinate frame associated with the tracking system, for example, placed with a pose that is related to the TS-determined RO Frame of Reference. As information (e.g., pose of the real object) from the tracking system is streamed to the virtual modeling software, if the M1 transform changes (i.e., the pose of the real object in 3D space), the pose of the various virtual objects may update, for example, in real time.

Referring again to FIG. 1, the camera 102 may also need to be calibrated before the AR system may accurately deform, alter or align virtual objects as the camera 102 moves. The challenges and solutions associated with calibrating the camera 102 may be similar to those associated with calibrating virtual objects relative to the coordinate frame associated with the tracking system, as described above. To achieve precise alignment between virtual objects and a real world scene (as captured by camera 102), the virtual modeling software may need to track the pose of the lens of the camera 102, not just the camera body as a whole. Various methods for calibrating cameras involved a lengthy trial and error process (e.g., taking several hours) to manually manipulate six parameters (e.g., X, Y, Z, roll, pitch, yaw) associated with the camera lens. With these manual methods, accurate placement of the camera lens is not ensured, even after calibration is complete.

Figure 7:
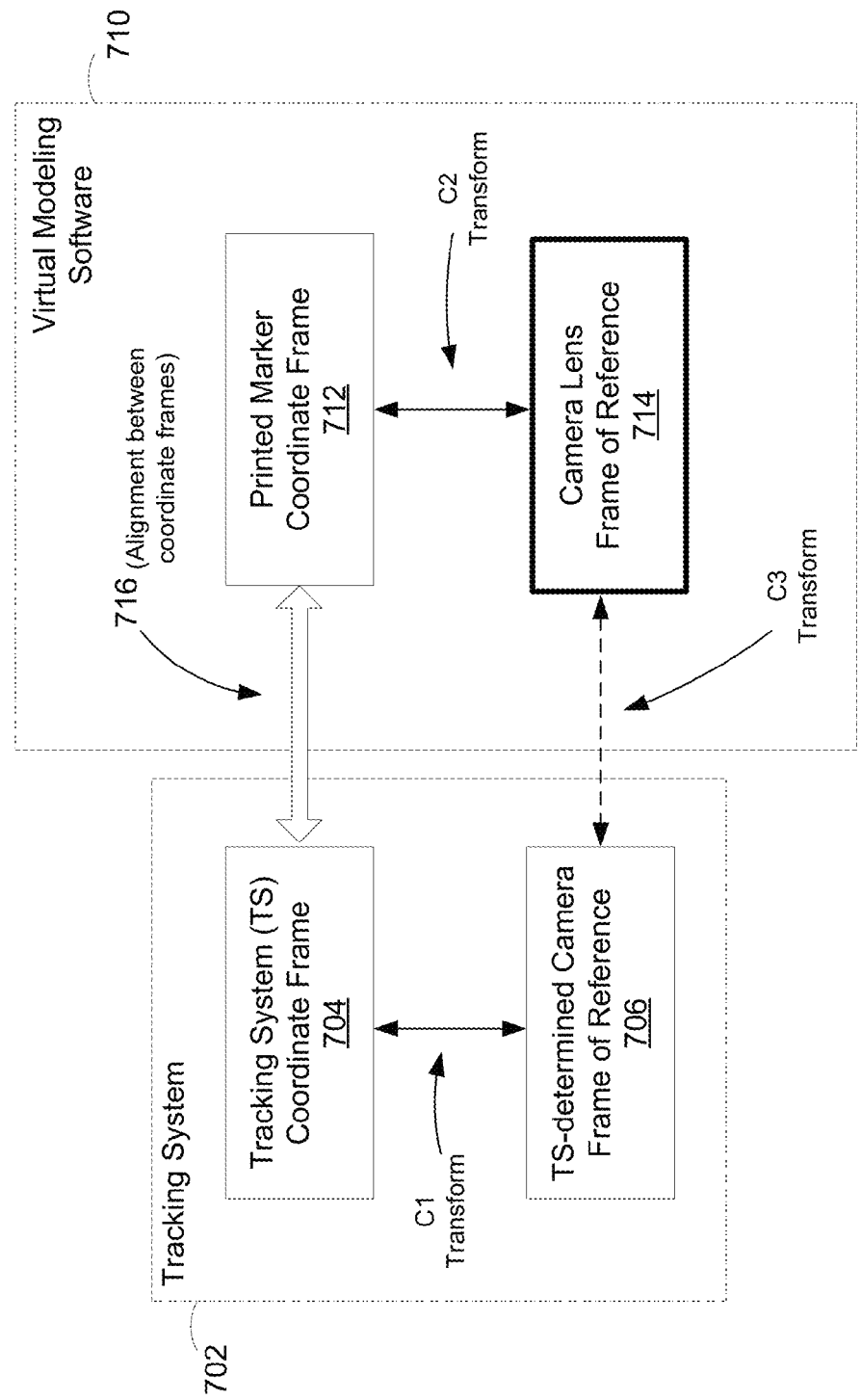
FIG. 7 depicts a block diagram showing an example calibration technique, according to one or more embodiments of the present disclosure.
Figure 8A:
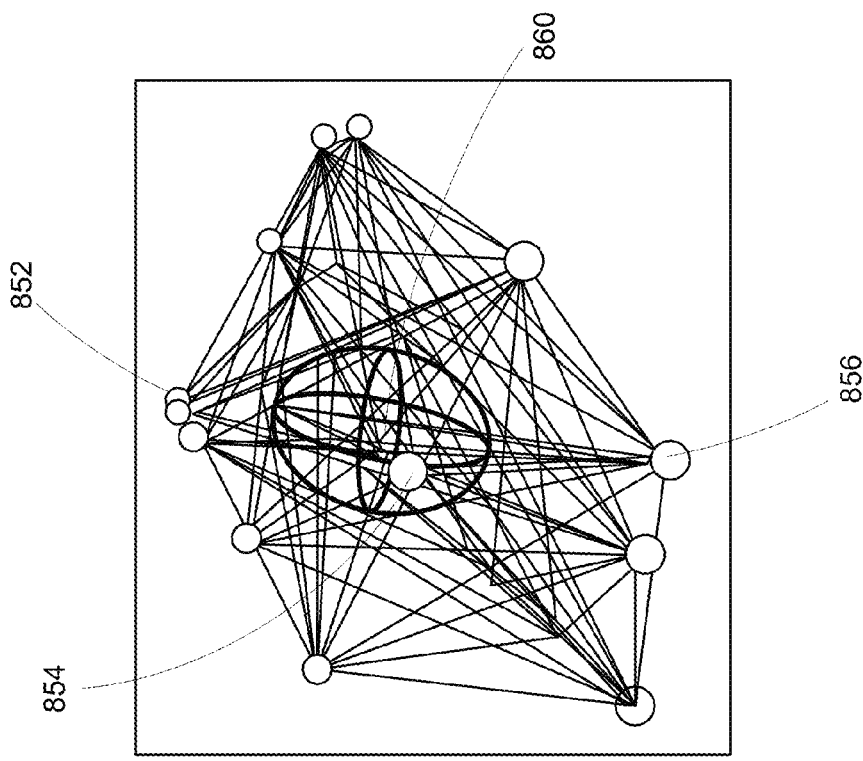
FIG. 8A depicts an illustration of an example camera and camera frame, according to one or more embodiments of the present disclosure.

FIG. 7 depicts a block diagram showing an example calibration technique, according to one or more embodiments of the present disclosure. More specifically, FIG. 7 shows an automated frame of reference calibration technique that may be used to determine and/or calculate a mapping or transform between the frame of reference of a camera as tracked by a tracking system and the frame of reference of the lens of the camera. As can be seen in FIG. 7, a tracking system 702 (e.g., similar to tracking system 108 of FIG. 1) may establish a coordinate frame 704, for example, as part of a tracking system setup performed by a technician (explained in detail above). The tracking system 702 may determine a frame of reference 706 for a camera. In other words, the tracking system 702 may track the camera. The camera may be similar to camera 102 of FIG. 1, for example. The camera may be an independent camera or may be incorporated into a computer, for example, the computer that runs the virtual modeling software. FIG. 8A shows an illustration of an example camera 800. In order for the tracking system to track (i.e., determine a frame of reference for) the camera 800, a number (e.g., three or more) of tracking markers (e.g., tracking markers 802, 804, 806) may be attached to or placed on the camera 800. In some embodiments the tracking markers may be attached to the camera body itself. In other embodiments, the tracking markers may be attached to a frame 801 that contains and/or supports the camera 800, as shown in the example of FIG. 8A. For proper tracking, the tracking markers may have to be placed appropriately on the camera 800, for example, in a non-collinear arrangement. For proper tracking, at least three non-collinear tracking markers may be placed on the camera (or camera frame). More than three tracking markers may be placed on the camera, for example, to improve reliability and/or accuracy of calculations, for example, in case view of one of the tracking markers is obstructed.

Figure 8B:
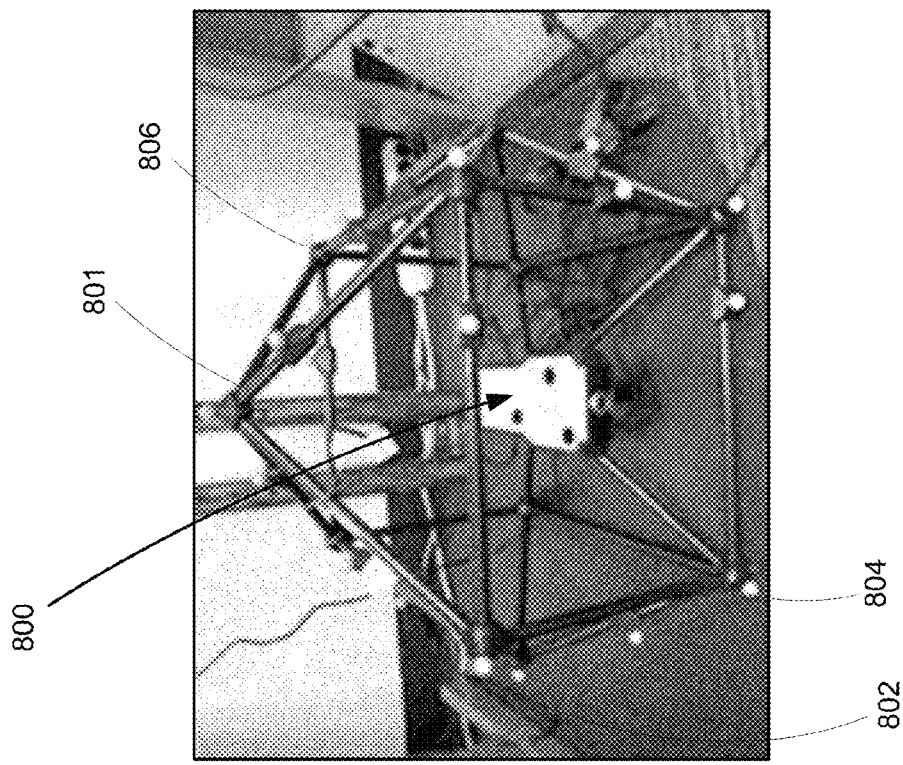
FIG. 8B depicts an illustration of how a tracking system may create and place a representation of a camera, according to one or more embodiments of the present disclosure.

The tracking system (e.g., including a number of infrared cameras) may detect the tracking markers on the camera (or camera frame) and may create and place a representation of the camera in the coordinate frame established by the tracking system. FIG. 8B shows an illustration of how a tracking system may create and place a representation of a camera. The tracking system may detect the location of the tracking markers (e.g., markers 802, 804, 806 and perhaps various other markers) and may create and place points (e.g., points 852, 854, 856 and perhaps various others), respectively associated with the tracking markers, in the coordinate frame of the tracking system. From these points (e.g., points 852, 854, 856 and perhaps others), the tracking system may determine an origin (e.g., point 860) and an orientation (see cube and orientation lines that surround point 860) for the representation of the real object. The origin may be determined by calculating a centroid (e.g., a center of mass) of the points 852, 854, 856 and perhaps others. The orientation may be set to match (or related to) the orientation of the coordinate system of the tracking system. Once the tracking system determines a frame of reference (e.g., an origin/location and orientation associated with the tracking system coordinate frame) for the camera, the tracking system may stream information about the pose of the camera to the virtual modeling software. The streaming pose information about the camera may update in real time as the camera may move and/or rotate.

Figure 8C:
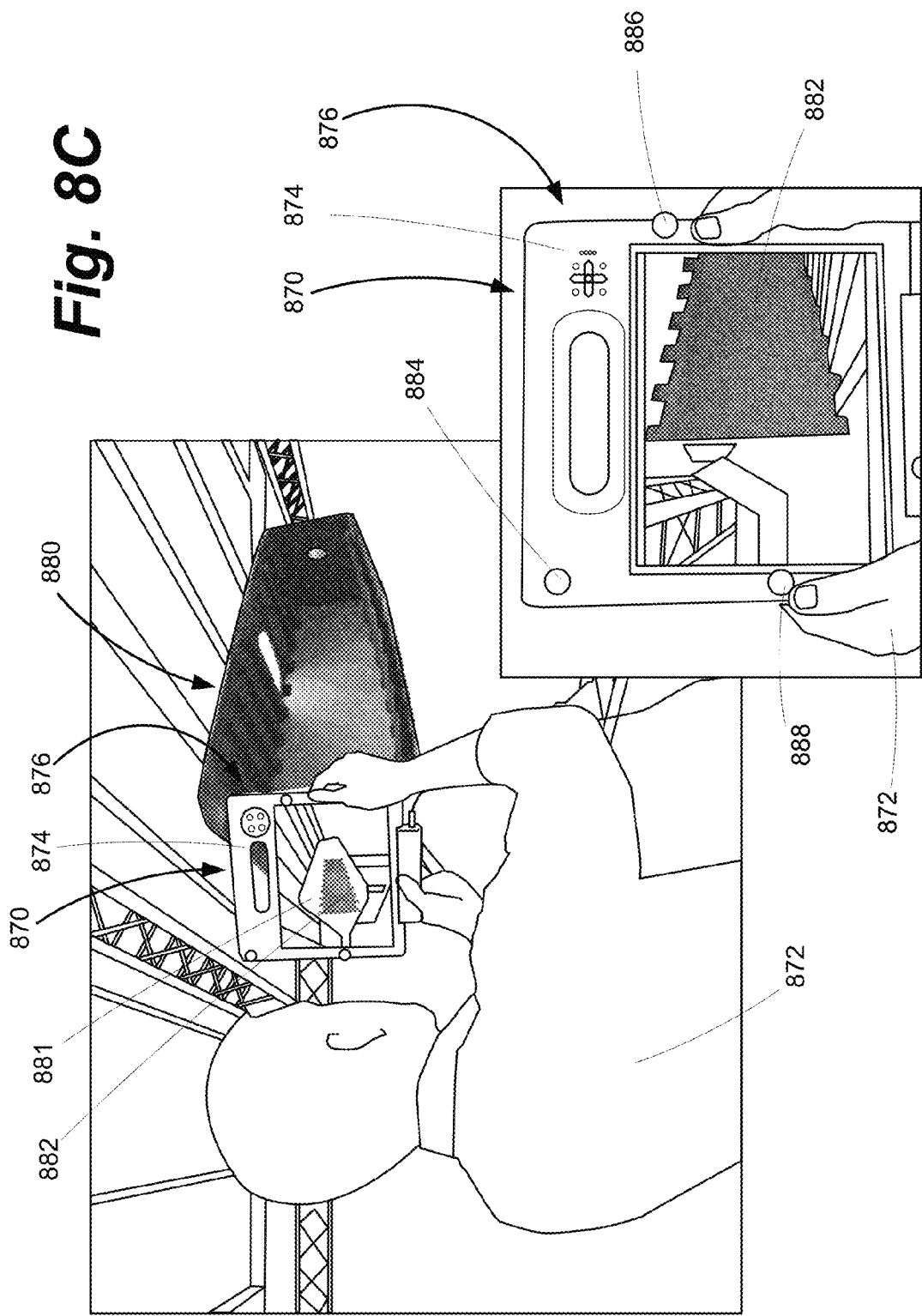
FIG. 8C depicts an illustration of an example tablet computer with an integrated camera, according to one or more embodiments of the present disclosure.

In some embodiments of the present disclosure, the camera may be incorporated into a computer, for example, the computer that runs the virtual modeling software. As one specific example, the computer may be a tablet computer with an integrated camera. FIG. 8C shows an illustration of an example tablet computer 870 with an integrated camera. For example, a first side 874 of the tablet computer 870 may face a user 872, and an opposite second side 876 may face away from the user 872. The camera may be mounted on the second side 876, such that the camera may capture a real object (e.g., real object 880). If the AR system is properly calibrated, the user 872 may see a real world scene (including a view 881 of real object 880) on the screen of the tablet computer 870. The screen may also display virtual content (e.g., virtual content 882), overlaid on top of the real world scene/real object. In order for a tracking system to track the camera (e.g., incorporated into the tablet computer 870), a number of tracking markers (e.g., tracking markers 884, 886, 888) may be mounted on the tablet computer 870. Then, the tracking of the camera may be done in a similar method to that explained above.

Referring again to FIG. 7, the virtual modeling software 710 may receive streaming information from the tracking system 702 about the pose/frame of reference of the camera. However, the virtual modeling software 710 may need to track the location of the lens of the camera, instead of the camera body (or a camera frame, or a tablet computer) as a whole. To determine a frame of reference for the camera lens, a special printed marker and related software may be used. FIGS. 9A and 9B depict illustrations that show how the printed marker may allow for determination of the lens's frame of reference. As shown in FIG. 9A, a camera 902 may capture or record real world items it the camera's field of view 904. A special printed marker 906 may be placed in the camera's field of view 904. It should be understood that the printed marker 906 may only be used to calibrate the camera and the AR system. Once the virtual modeling software is able to track the lens of the camera, the virtual marker 906 may be removed.

To calibrate the AR system, the printed marker 906 may be placed in the field of view 904 of the camera, for example, somewhere in the 3D space of a room or lab (e.g., on the floor). The printed marker 906 may include various markings (e.g., markings 908) that may indicate a coordinate frame (e.g., an origin and orientation) for the printed marker. The camera 902 may then capture the printed marker 906 (including the various markings) and may stream this information to a computer 910 (e.g., similar to the computer 106 of FIG. 1). The computer 910 may be the same computer that includes the virtual modeling software. The computer 910 may include software 912 that is associated with the printed marker 906. The printed marker software 912 may receive information from camera 902, including how the camera "sees" the printed marker 906, for example, how the printed marker appears to be located and oriented in the camera's field of view. The printed marker software 912 may then process this information to determine a frame of reference (e.g., an origin and orientation) for the lens of camera 902, for example, as the lens is placed in the coordinate frame established by the printed marker 906 (and the various markings 908). As one example, and referring to FIG. 9B, for calibration purposes, the camera 902 and the printed marker 906 may be oriented relative to each other such that the axes established by the printed marker (e.g., X, Y, Z) are aligned with the vertical, horizontal and depth axes of the camera, specifically the lens of the camera.

Referring again to FIG. 7, the virtual modeling software (e.g., via software related to a special printed marker) may determine a camera lens frame of reference 714, for example, as it relates to a coordinate frame 712 established by the printed marker. In order to relate the pose of the camera lens to the pose of various virtual objects, the virtual modeling software may place the camera lens into a coordinate frame associated with the tracking system, for example, by relating the frame of reference 714 of the camera lens to the frame of reference 706 of the camera as a whole, as tracked by the tracking system. However, the virtual modeling software 710 may not be able to relate the frame of reference 714 of the camera lens to the frame of reference 706 of the camera as a whole until the AR system has been calibrated, for example, because the coordinate frame 712 established by the printed marker may be different than the coordinate frame 704 established by the tracking system. Therefore, the calibration process may include aligning (generally shown by number 716) the coordinate frame 712 established by the printed marker and the coordinate frame 704 established by the tracking system. This alignment may include placing the printed marker (e.g., the origin of the printed marker) at the same location (e.g., the same location in 3D space on the floor of a room or lab) as the origin of the tracking system coordinate frame. The alignment may also include aligning the axes (e.g., X, Y, Z) of the printed marker with the axes of the coordinate frame of the tracking system. In this respect, once the two coordinate frames are aligned, the virtual modeling software 710 may treat them as the same coordinate frame.

To relate the frame of reference 714 of the camera lens to the frame of reference 706 of the camera as a whole, the virtual modeling software 710 may determine/calculate a mapping or transform (e.g., the C3 Transform shown in FIG. 7). The C3 transform may not be known before the calibration process is complete. The calibration process, as explained above, may determine various other mappings or transforms that are related to the C3 transform. As shown in FIG. 7, the calibration process may determine the C1 Transform (i.e., where the tracking system places the tracked camera in its coordinate frame) and the C2 Transform (i.e., the translational and rotational differences between the printed marker coordinate frame 712 and the new camera lens frame of reference 714 as determined by the software associated with the printed marker). Once the C1 and C2 transforms are known, the C3 transform may be calculated. Once the C3 transformation is known, the camera may be moved around, and the virtual modeling software may track the camera lens in the coordinate frame of the tracking system, even if the printed marker no longer appears in the field of view of the camera. As information (e.g., pose of the camera) from the tracking system is streamed to the virtual modeling software, if the C1 transform changes (i.e., the pose of the camera in 3D space), the C3 transform may update, for example, in real time. In this respect, virtual objects may overlay on a real world scene, and the appearance of the virtual objects may change appropriately, for example, as the camera moves.

The following explains one example technique to compute the C3 transform, as shown in FIG. 7. The various transforms (C1, C2, C3) as shown in FIG. 7 may each be represented as a transform matrix, for example, a 4×4 transformation matrix as is commonly used in 3D computer graphics. The C1 transform may be represented as the transform matrix shown in Eq. 6 below. The C2 transform may be represented as the transform matrix shown in Eq. 7 below.

$$C_1 = \begin{bmatrix} DCM_1 & v_1 \\ 000 & 1 \end{bmatrix} \quad \text{(Eq. 6)}$$

$$C_2 = \begin{bmatrix} DCM_2 & v_2 \\ 000 & 1 \end{bmatrix} \quad \text{(Eq. 7)}$$

Similar to the $M_n$ transform matrices described above, each $C_n$ transform matrix may include a rotational or orientation component ($DCM_n$) and a translational or location component ($v_n$). The C3 transform may then be calculated as shown in Eq. 8 below, resulting in the C3 transform shown in Eq. 9 below.

$$C_3 = \begin{bmatrix} DCM_1 & v_1 \\ 000 & 1 \end{bmatrix} \begin{bmatrix} DCM_2 & v_2 \\ 000 & 1 \end{bmatrix}^{-1} \quad \text{(Eq. 8)}$$

$$C_3 = \begin{bmatrix} DCM_3 & v_3 \\ 000 & 1 \end{bmatrix} \quad \text{(Eq. 9)}$$

Then, referring again to FIG. 7, the C3 transform may be used to place the camera lens in a coordinate frame associated with the tracking system, for example, by relating the pose of the camera lens to the pose of the camera as tracked by the tracking system. As information (e.g., pose of the camera) from the tracking system is streamed to the virtual modeling software, if the C1 transform changes (i.e., the pose of the camera in 3D space), the C3 transform may update, for example, in real time. In operation, the updating of the C3 transform may work as follows: The tracking system 702 may detect a change in pose of a camera (tracking system updates C1). The tracking system 702 may stream frame of reference 706 information (e.g., in the form of a transform matrix) of the camera to the virtual modeling software 710. The virtual modeling software may multiply that frame of reference/transform matrix by the C3 transform matrix to perform the C3 transform. The virtual modeling software may then update the pose of various virtual objects in the coordinate frame associated with the tracking system based on the changing pose of the camera.

Referring again to FIG. 1, the virtual modeling software 110 may perform various routines, techniques and the like described herein to create an dynamically augmented scene (e.g., augmented scene 114), for example, a real time view of the real world space as captured by the camera 102 augmented and/or overlaid with dynamically changeable virtual objects. Once calibration of the AR system is achieved, as described above, the virtual modeling software 110 may dynamically maintain correlation and/or alignment between various virtual objects and a live real world scene, including one or more real objects (e.g., real object 104). The virtual modeling software 110 may maintain this alignment even as the camera 102 may be moved and rotated about an object 104, and even as the real object 104 may be moved and rotated.

The virtual modeling software 110 may produce a dynamically augmented scene 114 (e.g., displayed on display 116) that shows virtual objects placed on a live video feed. The virtual modeling software 110 may appropriately deform (e.g., alter 3D location, 3D orientation, and/or 3D size) virtual objects in the augmented scene, for example, depending upon the pose of the camera 102 and/or the pose of the real object 104. For example, if the camera 102 moves further away from the real object 104, one or more virtual objects in the augmented scene may shrink As another example, if the camera 102 moves closer to the real object 104, one or more virtual objects would enlarge. As another example, if the camera 102 moves at an angle relative to the real object 104, one or more virtual objects would rotate appropriately. The augmented scene 114 may be stored (e.g., momentarily) in memory (e.g., a volatile or non-volatile memory unit) before the augmented scene is displayed on display 116. The augmented or virtual content that is displayed on display 116 and/or maintained in the augmented scene 114 may be useful to a user that is using the AR system. For example, a user may interact with the virtual content and/or receive beneficial information from the augmented content. As one specific example, virtual objects/content may provide valuable instructional information to a technician regarding a piece of machinery during a manufacturing process.

Figure 10A:
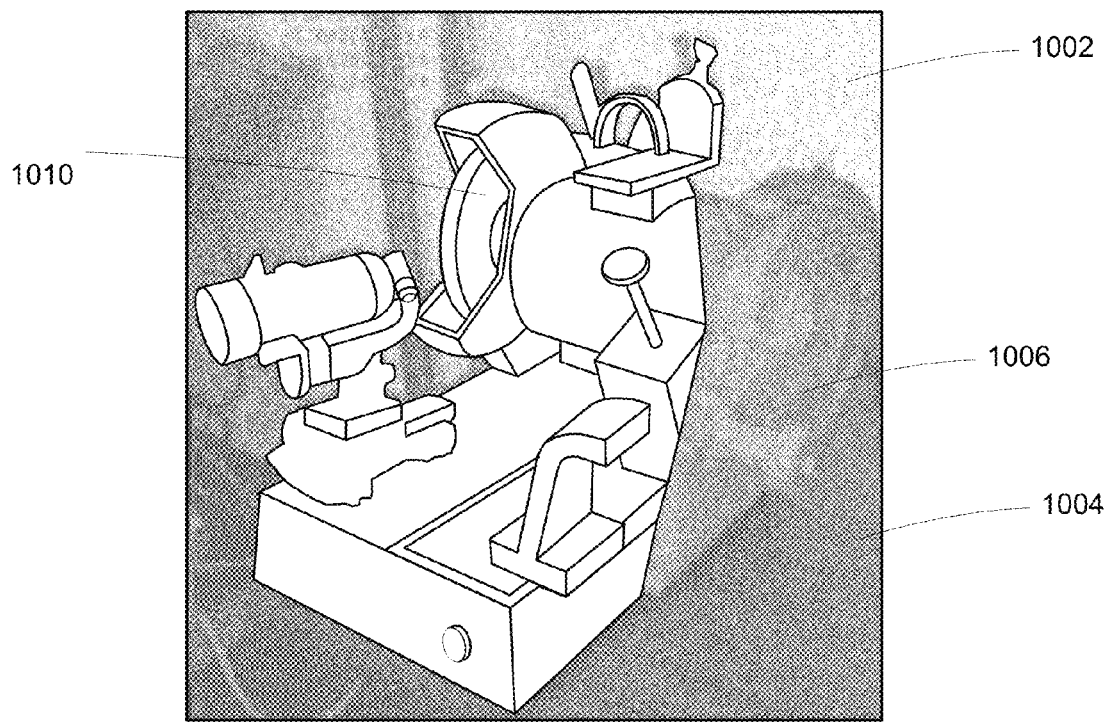
FIG. 10A depicts an illustration of an example augmented scene that may be produced according to one or more embodiments of the present disclosure.

FIG. 10A depicts an illustration of an example augmented scene that may be produced according to one or more embodiments of the present disclosure. The augmented scene may include a real world scene/environment as captured by a camera, for example, a part of a room 1002, with a table 1004 and a real object 1006 (e.g., a piece of machinery) on the table. The augmented scene may include one or more virtual objects as added by the AR system described herein, for example, a virtual object 1010 that is related to (e.g., a CAD model based off of) the real object 1006. FIG. 10A shows only part (e.g., a cut-away) of the virtual object 1010. This cut-away view may aid in showing how the virtual object 1010 may align with the real object 1006. It should be understood, however, that in some embodiments, the full virtual object may be displayed in the augmented scene. If the camera moves, the real world scene and the virtual objects may move in a similar manner. If the real object moves, any virtual objects that are related to the real object may move in a similar manner. The example augmented scene of FIG. 10A is one example to show how the virtual objects modeled off of the real object may be aligned with the real object, for example, to calibrate the AR system. In some examples, after calibration is complete, the virtual object modeled off of the real object may not appear in the augmented scene. Instead, various other virtual objects may appear, for example, tools, hardware (e.g., screws), wiring, instructions and the like that are related to the real object. For example, these virtual objects may provide valuable instructional information to a technician regarding a piece of machinery, for instance, instructions regarding how to install an item or perform a task (e.g., such as drilling a hole).

Figure 10B:
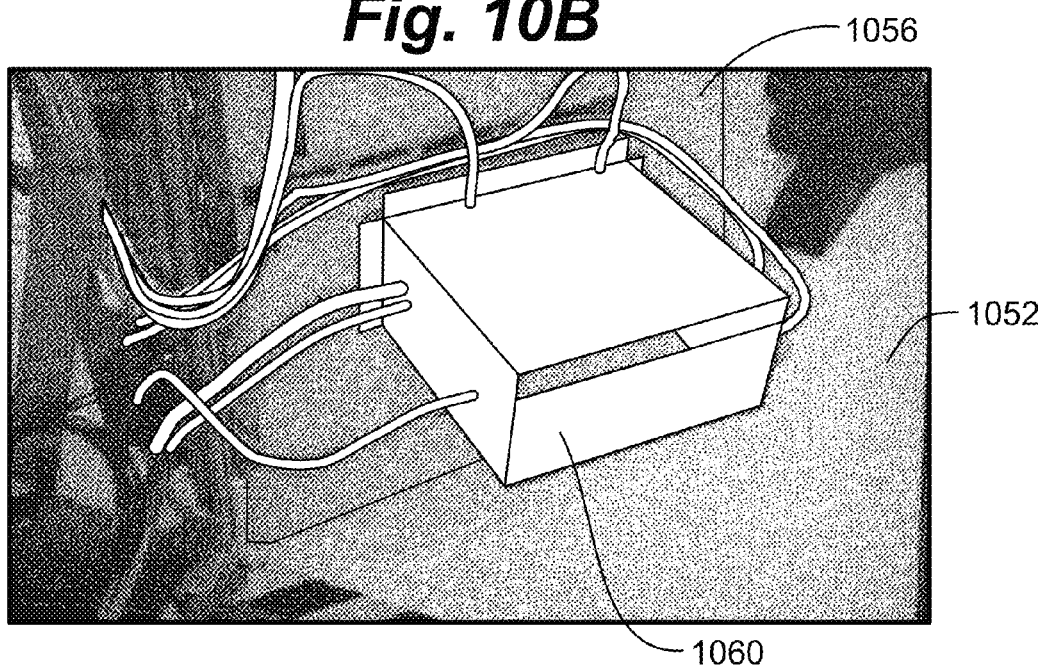
FIG. 10B depicts an illustration of an example augmented scene that may be produced according to one or more embodiments of the present disclosure.

FIG. 10B depicts an illustration of an example augmented scene that may be produced according to one or more embodiments of the present disclosure. The augmented scene may include a real world scene/environment as captured by a camera, for example, a part of a room 1052, with a real object 1056 (e.g., a panel). The augmented scene may include one or more virtual objects as added by the AR system described herein, for example, a virtual object 1060, which may be a box or unit, and various associated wires, conduits and/or wire harnesses. If the camera moves, the real world scene and the virtual objects may move in a similar manner. If the real object 1056 moves (e.g., the panel), any virtual objects (e.g., virtual object 1060) that are related to the real object may move in a similar manner. For example, the example augmented scene of FIG. 10B may instruct a technician how to install a unit 1060 on a panel 1056.

Certain embodiments of the present disclosure may be found in one or more methods for automated frame of reference calibration for augmented reality. With respect to the various methods described herein and depicted in associated figures, it should be understood that, in some embodiments, one or more of the steps described and/or depicted may be performed in a different order. Additionally, in some embodiments, a method may include more or less steps than are described and/or depicted.

FIG. 11 depicts a flow diagram 1100 that shows example steps in a method for automated frame of reference calibration for augmented reality, in accordance with one or more embodiments of the present disclosure. More specifically, FIG. 11 shows example steps in a method for automated frame of reference calibration that may be used to determine and/or calculate a mapping or transform between the frame of reference of virtual objects (e.g., virtual objects added to an augmented scene) and the frame of reference associated with a tracking system. At step 1102, a coordinate system for the tracking system is established, for example, during a setup process for the tracking system. At step 1104, the tracking system may track or determine a frame of reference for a real object (RO). The tracking system may also determine the M1 Transform at step 1104. In order for the tracking system to track a real object, the real object may need to be equipped with a number of tracking markers.

At step 1106, virtual modeling software may determine a new frame of reference for the real object, for example, by indicating a number of points of reference (e.g., using a wand) and computing an origin. At step 1108, virtual modeling software may compute the M2 Transform (e.g., the difference in pose between the new RO frame of reference and the frame of reference of the real object as determined by the tracking system). At step 1110, the virtual modeling software may access or load a virtual object (e.g., a virtual object modeled off of the real object) and may determine the frame of reference of the VO. At step 1112, the virtual modeling software may determine a new VO frame of reference, for example, by indicating on the virtual model the same points of reference that were indicated on the real object to create a new RO frame of reference. The origin of the points may be computed. At step 1114, the virtual modeling software may computer the M3 Transform (e.g., the difference in pose between the new VO frame of reference and the original VO frame of reference). At step 1116, the virtual modeling software may compute the M4 Transform (e.g., by multiplying together the M1, M2 and M3 transform matrices).

FIG. 12 depicts a flow diagram 1200 that shows example steps in a method for automated frame of reference calibration for augmented reality, in accordance with one or more embodiments of the present disclosure. More specifically, FIG. 12 shows example steps in a method for automated frame of reference calibration that may be used to determine and/or calculate a mapping or transform between the frame of reference of a camera as tracked by a tracking system and the frame of reference of the lens of the camera. At step 1202, a coordinate system for the tracking system is established, for example, during a setup process for the tracking system. At step 1204, the tracking system may track or determine a frame of reference for a camera. The tracking system may also determine the C1 Transform at step 1204. In order for the tracking system to track a camera, the camera (or camera frame, or tablet computer) may need to be equipped with a number of tracking markers. At step 1206, a coordinate frame associated with a printed marker may be established, for example, by using a printed marker and related software. The coordinate frame associated with the printed marker may be aligned with the coordinate frame of the tracking system. At step 1208, virtual modeling software (e.g., via the software associated with the printed marker) may determine the frame of reference of the camera lens, for example, relative to the coordinate frame of the printed marker. At step 1210, the virtual modeling software may compute the C2 Transform (e.g., the difference in pose between the camera lens frame of reference and the printed marker coordinate frame. This computation may be (at least partially) performed by the software associated with the printed marker. At step 1212, the virtual modeling software may compute the C3 Transform (e.g., by dividing the C1 Transform matrix by the C2 transform matrix.

The methods, routines and techniques of the present disclosure, including the example methods and routines illustrated in the flowcharts and block diagrams of the different depicted embodiments may be implemented as software executed by one or more data processing systems that are programmed such that the data processing systems are adapted to perform and/or execute part or all of the methods, routines and/or techniques described herein. Each block or symbol in a block diagram or flowchart diagram referenced herein may represent a module, segment or portion of computer usable or readable program code which comprises one or more executable instructions for implementing, by one or more data processing systems, the specified function or functions. In some alternative implementations of the present disclosure, the function or functions illustrated in the blocks or symbols of a block diagram or flowchart may occur out of the order noted in the figures. For example, in some cases two blocks or symbols shown in succession may be executed substantially concurrently or the blocks may sometimes be executed in the reverse order depending upon the functionality involved. Part or all of the computer code may be loaded into the memory of a data processing system before the data processing system executes the code.

Figure 13:
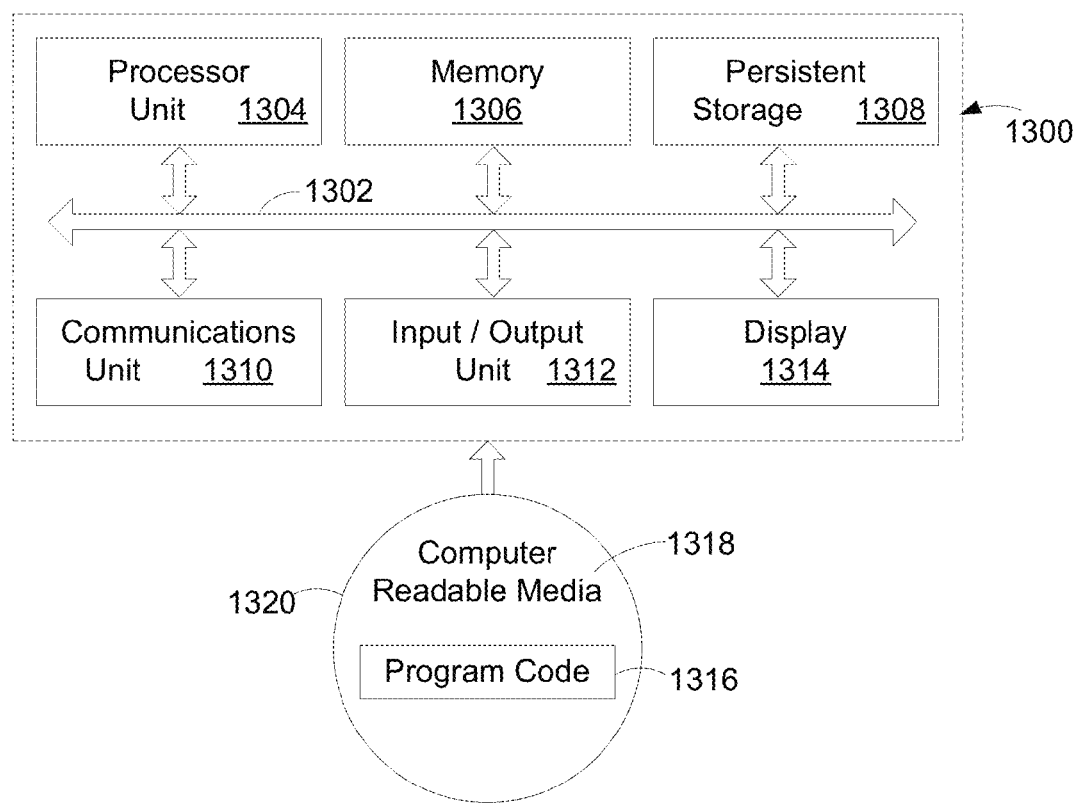
FIG. 13 depicts a block diagram of an example data processing system that may be used to implement one or more embodiments of the present disclosure.

FIG. 13 depicts a block diagram of an example data processing system 1300 that may be used to implement one or more embodiments of the present disclosure. For example, referring also to FIG. 1 momentarily, computer 106 may take the form of a data processing system similar to data processing system 1300 of FIG. 13. As another example, tracking system software related to tracking system 108 may be executed on a data processing system similar to data processing system 1300 of FIG. 13. Referring to FIG. 13, data processing system 1300 may be used to execute, either partially or wholly, one or more of the methods, routines and/or solutions of the present disclosure. In some embodiments of the present disclosure, more than one data processing system may be used to implement the methods, routines, techniques and/or solutions described herein.

In the example of FIG. 13, data processing system 1300 may include a communications fabric 1302 which provides communications between components, for example a processor unit 1304, a memory 1306, a persistent storage 1308, a communications unit 1310, an input/output (I/O) unit 1312 and a display 1314. A bus system may be used to implement communications fabric 1302 and may be comprised of one or more buses such as a system bus or an input/output bus. The bus system may be implemented using any suitable type of architecture that provides for a transfer of data between different components or devices attached to the bus system.

Processor unit 1304 may serve to execute instructions (for example, a software program) that may be loaded into the data processing system 1300, for example, into memory 1306. Processor unit 1304 may be a set of one or more processors or may be a multiprocessor core depending on the particular implementation. Processor unit 1304 may be implemented using one or more heterogeneous processor systems in which a main processor is present with secondary processors on a single chip. As another illustrative example, processor unit 1304 may be a symmetric multi-processor system containing multiple processors of the same type.

Memory 1306 may be, for example, a random access memory or any other suitable volatile or nonvolatile storage device. Memory 1306 may include one or more layers of cache memory. Persistent storage 1308 may take various forms depending on the particular implementation. For example, persistent storage 1308 may contain one or more components or devices. For example, persistent storage 1308 may be a hard drive, a solid-state drive, a flash memory or some combination of the above.

Instructions for an operating system may be located on persistent storage 1308. In one specific embodiment, the operating system may be some version of a number of known operating systems. Instructions for applications and/or programs may also be located on persistent storage 1308. These instructions may be loaded into memory 1306 for execution by processor unit 1304. For example, the methods and/or processes of the different embodiments described in this disclosure may be performed by processor unit 1304 using computer implemented instructions which may be loaded into a memory such as memory 1306. These instructions are referred to as program code, computer usable program code or computer readable program code that may be read and executed by a processor in processor unit 1304.

Display 1314 may provide a mechanism to display information to a user, for example, via a LCD or LED screen or monitor, or other type of display. It should be understood, throughout this disclosure, that the term "display" may be used in a flexible manner to refer to either a physical display such as a physical screen, or to the image that a user sees on the screen of a physical device. Input/output (I/O) unit 1312 allows for input and output of data with other devices that may be connected to data processing system 1300. Input/output devices can be coupled to the system either directly or through intervening I/O controllers.

Communications unit 1310 may provide for communications with other data processing systems or devices, for example, via one or more networks. Communications unit 1310 may be a network interface card. Communications unit 1310 may provide communications through the use of wired and/or wireless communications links. In some embodiments, the communications unit may include circuitry that is designed and/or adapted to communicate according to various wireless communication standards, for example, WiFi standards, Bluetooth standards and the like.

The different components illustrated for data processing system 1300 are not meant to provide architectural limitations to the manner in which different embodiments may be implemented. The different illustrative embodiments may be implemented in a data processing system including components in addition to or in place of those illustrated for data processing system 1300. Other components shown in FIG. 13 can be varied from the illustrative examples shown.

The description of the different advantageous embodiments has been presented for purposes of illustration and the description and is not intended to be exhaustive or limited to the embodiments in the form disclosed. Many modifications and variations will be apparent to those of ordinary skill in the art. Further different advantageous embodiments may provide different advantages as compared to other advantageous embodiments. The embodiment or embodiments selected are chosen and described in order to best explain the principles of the embodiments of the practical application and to enable others of ordinary skill in the art to understand the disclosure for various embodiments with various modifications as are suited to the particular use contemplated.

The invention claimed is:

1. A method for augmented reality executed by a data processing system having at least one processor, the method comprising:

receiving or establishing a tracking system coordinate frame associated with an object tracking system,
wherein the tracking system coordinate frame is aligned with a real 3D space, and
wherein the tracking system tracks the position and orientation in a real 3D space of a real object and of a camera;
receiving from the tracking system a first real object frame of reference for the real object,
wherein the first real object frame of reference indicates a position and orientation of the real object relative to the tracking system coordinate frame;
determining a second real object frame of reference for the real object,
wherein the second real object frame of reference indicates a position and orientation of the real object relative to the tracking system coordinate frame;
receiving a first virtual object frame of reference for a virtual object,
wherein the virtual object is modeled after the real object, and
wherein the first virtual object frame of reference is unrelated to the tracking system coordinate frame;
determining a real object origin by calculating a centroid of three or more real object non-collinear points;
determining a second virtual object frame of reference for the virtual object,
wherein the second virtual object frame of reference indicates a position and orientation of the virtual object relative to the tracking system coordinate frame, and wherein the second real object frame of reference is aligned with the second virtual object frame of reference;
determining a virtual object origin by calculating a centroid of three or more virtual object non-collinear points;
determining a virtual object mapping between the first virtual object frame of reference and the tracking system coordinate frame, wherein the virtual object mapping includes a transform matrix to transform between the first virtual object frame of reference and the tracking system coordinate frame; and
displaying an augmented scene including a view of the real 3D space, a view of the real object and one or more overlaid virtual items,
wherein the virtual object mapping is used to place the one or more overlaid virtual items in the augmented scene such that the one or more virtual items are aligned with the real object.

2. The method of claim 1, wherein determining the second real object frame of reference includes:

receiving or detecting three or more real object non-collinear points on the real object,
wherein the location of three or more real object non-collinear points are defined relative to the tracking system coordinate frame; and
determining a real object orientation that is related to the orientation of the first real object frame of reference.

3. The method of claim 2, wherein determining the second virtual object frame of reference includes:

receiving or indicating three or more virtual object non-collinear points on the virtual object,
wherein the location of three or more virtual object non-collinear points are defined relative to the tracking system coordinate frame; and
determining a virtual object orientation.

4. The method of claim 3, wherein the second real object frame of reference and the second virtual object frame of reference are aligned by ensuring that:
  the three or more virtual object non-collinear points and the three or more real object non-collinear points are located at approximately the same location relative to the tracking system coordinate frame; and
  the real object orientation and the virtual object orientation are approximately the same as each orientation relates to the tracking system coordinate frame.

5. The method of claim 1, wherein determining the virtual object mapping includes:
  receiving or determining a first transform matrix that represents the first real object frame of reference;
  determining a second transform matrix that represents the difference in location and orientation between the first real object frame of reference and the second real object frame of reference;
  determining a third transform matrix that represents the difference in location and orientation between the first virtual object frame of reference and the second virtual object frame of reference; and
  computing a fourth transform matrix that represents the virtual object mapping,
    wherein the fourth transform matrix represents the difference in location and orientation between the first virtual object frame of reference and the tracking system coordinate frame, and
    wherein the fourth transform matrix is computed by performing matrix multiplication between the first, second and third transform matrices.

6. The method of claim 1, wherein using the virtual object mapping to place the one or more overlaid virtual items in the augmented scene includes:
  receiving a first virtual item frame of reference for a first overlaid virtual item,
    wherein the first virtual item frame of reference is unrelated to the tracking system coordinate frame;
  referencing the virtual object mapping to transform the first virtual item frame of reference to a transformed frame of reference that relates to the tracking system coordinate frame; and
  placing the first overlaid virtual item in the augmented scene using the transform frame of reference.

7. The method of claim 1, further comprising:
  receiving from the tracking system real-time information about the location and orientation of the real object;
  updating the virtual object mapping based on the real-time information; and
  updating the augmented scene by updating the placement of the one or more overlaid virtual items such that the one or more virtual items remain aligned with the real object.

8. A method for augmented reality executed by a data processing system having at least one processor, the method comprising:
  receiving or establishing a tracking system coordinate frame associated with an object tracking system,
    wherein the tracking system coordinate frame is aligned with a real 3D space, and
    wherein the tracking system tracks the position and orientation in a real 3D space of a camera that captures the real 3D space and a printed marker;
  receiving from the tracking system a camera frame of reference for the camera,
    wherein the camera frame of reference indicates a position and orientation of the camera relative to the tracking system coordinate frame;
  receiving or establishing a printed marker coordinate frame associated with the printed marker,
    wherein the printed marker coordinate frame is aligned with the real 3D space, and
    wherein the printed marker coordinate frame is aligned with the tracking system coordinate frame;
  determining a printed marker origin by calculating a centroid of three or more printed marker non-collinear points;
  determining a camera lens frame of reference for the lens of the camera,
    wherein the camera lens frame of reference indicates a position and orientation of the camera lens relative to the printed marker coordinate frame;
  determining a camera lens mapping between the camera frame of reference and the camera lens frame of reference, wherein the camera lens mapping includes a transform matrix to transform between the camera frame of reference and the camera lens frame of reference; and
  displaying an augmented scene including a view of the real 3D space and one or more virtual items,
    wherein the camera lens mapping is used to alter or distort the one or more virtual items in the augmented scene.

9. The method of claim 8, wherein determining the camera lens frame of reference includes receiving camera lens position and orientation information a software program associated with the printed marker.

10. The method of claim 8, wherein aligning the printed marker coordinate frame with the tracking system coordinate frame includes placing the printed marker at a location and orientation in the real 3D space such that:
  an origin associated with the printed marker is located at approximately the same location in the 3D space as an origin associated with the tracking system; and
  three axes associated with the printed marker are approximately aligned in the 3D space with three axes associated with the tracking system.

11. The method of claim 8, wherein determining the camera lens mapping includes:
  receiving or determining a first transform matrix that represents the first real object frame of reference;
  determining a second transform matrix that represents the difference in location and orientation between the camera lens frame of reference and the printed marker coordinate frame;
  computing a third transform matrix that represents the camera lens mapping,
    wherein the third transform matrix represents the difference in location and orientation between the camera frame of reference and the camera lens frame of reference, and
    wherein the third transform matrix is computed by performing matrix division either between the first and second transform matrices or between the second and first transform matrices.

12. The method of claim 8, wherein using the camera lens mapping to alter or distort the one or more overlaid virtual items in the augmented scene includes:
  placing a first overlaid virtual item in the augmented scene using a first virtual item frame of reference,
    wherein the first virtual item frame of reference relates to the tracking system coordinate frame;

receiving from the tracking system real-time information about the location and orientation of the camera;

referencing the virtual object mapping to transform to update the camera lens frame of reference based on the real-time information; and updating the augmented scene by altering or distorting the one or more overlaid virtual items based on the updated the camera lens frame of reference.

13. The method of claim 8, wherein altering or distorting the one or more overlaid virtual items in the augmented scene includes shrinking the overlaid virtual items in response to the camera moving further away from a real object in the 3D space.

14. The method of claim 8, wherein altering or distorting the one or more overlaid virtual items in the augmented scene includes enlarging the overlaid virtual items in response to the camera moving closer to a real object in the 3D space.

15. The method of claim 8, wherein altering or distorting the one or more overlaid virtual items in the augmented scene includes rotating the overlaid virtual items in response to the camera moving at an angle relative to a real object in the 3D space.

16. A system, comprising:
a camera that captures a view of a real 3D space including a real object;
a tracking system that tracks the position and orientation in a real 3D space of the real object and of the camera, wherein the tracking system is configured to establish a tracking system coordinate frame associated with the tracking system, wherein the tracking system coordinate frame is aligned with the real 3D space; and
a computer coupled to the camera and the tracking system, the computer having one or more memory units, the computer being configured with a virtual modeler,
wherein the virtual modeler is configured to receive from the tracking system a first real object frame of reference for the real object, wherein the first real object frame of reference indicates a position and orientation of the real object relative to the tracking system coordinate frame;
wherein the virtual modeler is further configured to compute a second real object frame of reference for the real object, wherein the second real object frame of reference indicates a position and orientation of the real object relative to the tracking system coordinate frame;
wherein the virtual modeler is further configured to compute the second real object frame of reference by:
receiving or detecting three or more real object non-collinear points on the real object, wherein the location of three or more real object non-collinear points are defined relative to the tracking system coordinate frame;
determining a real object origin by calculating a centroid of the three or more real object non-collinear points; and
determining a real object orientation that is related to the orientation of the first real object frame of reference;
wherein the virtual modeler is further configured to receive from the one or more memory units a first virtual object frame of reference for a virtual object, wherein the virtual object is modeled after the real object, and wherein the first virtual object frame of reference is unrelated to the tracking system coordinate frame;
wherein the virtual modeler is further configured to compute a second virtual object frame of reference for the virtual object, wherein the second virtual object frame of reference indicates a position and orientation of the virtual object relative to the tracking system coordinate frame, and wherein the second real object frame of reference is aligned with the second virtual object frame of reference;
wherein the virtual modeler is further configured to compute the second virtual object frame of reference by:
receiving or indicating three or more virtual object non-collinear points on the virtual object, wherein the location of three or more virtual object non-collinear points are defined relative to the tracking system coordinate frame;
determining a virtual object origin by calculating a centroid of the three or more virtual object non-collinear points; and
determining a virtual object orientation;
wherein the virtual modeler is further configured to compute a virtual object mapping between the first virtual object frame of reference and the tracking system coordinate frame, and wherein the virtual object mapping includes a transform matrix to transform between the first virtual object frame of reference and the tracking system coordinate frame; and
wherein the virtual modeler is further configured to generate and store in the one or more memory units an augmented scene including a view of the real 3D space, a view of the real object and one or more overlaid virtual items, wherein the virtual object mapping is used to place the one or more overlaid virtual items in the augmented scene such that the one or more virtual items are aligned with the real object.

17. The system of claim 16, further comprising a display coupled to the computer, wherein the virtual modeler is further configured to communicate the augmented scene to the display, and wherein the display is configured to show the augmented scene to a user.

18. The system of claim 16, wherein using the virtual object mapping to place the one or more overlaid virtual items in the augmented scene includes:
receiving a first virtual item frame of reference for a first overlaid virtual item,
wherein the first virtual item frame of reference is unrelated to the tracking system coordinate frame;
referencing the virtual object mapping to transform the first virtual item frame of reference to a transformed frame of reference that relates to the tracking system coordinate frame; and
placing the first overlaid virtual item in the augmented scene using the transform frame of reference.

19. The method of claim 16, wherein the virtual modeler is further configured to:
receive from the tracking system real-time information about the location and orientation of the real object;
update the virtual object mapping based on the real-time information; and
update the augmented scene by updating the placement of the one or more overlaid virtual items such that the one or more virtual items remain aligned with the real object.

20. A data processing system, comprising:
one or more memory units that store computer code; and
one or more processor units coupled to the one or more memory units, wherein the one or more processor units execute the computer code stored in the one or more memory units to:
  receive or establish a tracking system coordinate frame associated with an object tracking system,
    wherein the tracking system coordinate frame is aligned with a real 3D space, and
    wherein the tracking system tracks the position and orientation in a real 3D space of a camera that captures the real 3D space and a printed marker;
  receive from the tracking system a camera frame of reference for the camera,
    wherein the camera frame of reference indicates a position and orientation of the camera relative to the tracking system coordinate frame;
  receive or establish a printed marker coordinate frame associated with the printed marker,
    wherein the printed marker coordinate frame is aligned with the real 3D space, and
    wherein the printed marker coordinate frame is aligned with the tracking system coordinate frame;
    wherein receiving or establishing the printed marker coordinate frame includes:
      receiving or detecting three or more printed marker non-collinear points on the printed marker, wherein the location of three or more printed marker non-collinear points are defined relative to the tracking system coordinate frame;
      determining a printed marker origin by calculating a centroid of the three or more printed marker non-collinear points; and
      determining a printed marker orientation that is related to the orientation of the printed marker coordinate frame;
  determine a camera lens frame of reference for the lens of the camera,
    wherein the camera lens frame of reference indicates a position and orientation of the camera lens relative to the printed marker coordinate frame;
  determine a camera lens mapping between the camera frame of reference and the camera lens frame of reference, wherein the camera lens mapping includes a transform matrix to transform between the camera frame of reference and the camera lens frame of reference; and
  display an augmented scene including a view of the real 3D space and one or more virtual items,
    wherein the camera lens mapping is used to alter or distort the one or more virtual items in the augmented scene.

* * * * *